(12) United States Patent
Nabuurs et al.

(10) Patent No.: US 9,688,804 B2
(45) Date of Patent: Jun. 27, 2017

(54) POLYMERIC BEADS, PROCESS AND COMPOSITION

(71) Applicant: DSM IP ASSETS B.V., Heerlen (NL)

(72) Inventors: Tijs Nabuurs, Echt (NL); Gerardus Cornelis Overbeek, Echt (NL); Jeffrey Stubbs, Echt (NL); Matthew Stewart Gebhard, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/376,222

(22) PCT Filed: Feb. 4, 2013

(86) PCT No.: PCT/EP2013/052171
§ 371 (c)(1),
(2) Date: Aug. 1, 2014

(87) PCT Pub. No.: WO2013/113935
PCT Pub. Date: Aug. 8, 2013

(65) Prior Publication Data
US 2014/0377464 A1    Dec. 25, 2014

(30) Foreign Application Priority Data

| Feb. 3, 2012 | (EP) | 12153838 |
| Feb. 3, 2012 | (EP) | 12153839 |
| Feb. 3, 2012 | (EP) | 12153840 |
| Feb. 3, 2012 | (EP) | 12153842 |
| Jul. 10, 2012 | (EP) | 12175782 |
| Jul. 10, 2012 | (EP) | 12175784 |
| Jul. 10, 2012 | (EP) | 12175785 |
| Jul. 10, 2012 | (EP) | 12175786 |
| Jul. 10, 2012 | (EP) | 12175788 |

(51) Int. Cl.
*C09D 135/02* (2006.01)
*C08F 301/00* (2006.01)
(Continued)

(52) U.S. Cl.
CPC .......... *C08F 301/00* (2013.01); *B05D 3/0254* (2013.01); *B05D 3/06* (2013.01); *B05D 3/108* (2013.01); *C08F 8/32* (2013.01); *C08F 8/42* (2013.01); *C08F 8/44* (2013.01); *C08F 22/10* (2013.01); *C08F 22/38* (2013.01); *C08F 26/08* (2013.01); *C08F 220/06* (2013.01); *C08F 220/14* (2013.01); *C08F 220/18* (2013.01); *C08F 222/14* (2013.01); *C08F 293/005* (2013.01); *C08L 33/02* (2013.01); *C08L 33/10* (2013.01); *C08L 33/12* (2013.01); *C08L 35/02* (2013.01); *C08L 51/003* (2013.01); *C08L 67/08* (2013.01); *C08L 75/04* (2013.01); *C09D 125/14* (2013.01); *C09D 133/02* (2013.01); *C09D 133/08* (2013.01); *C09D 133/10* (2013.01); *C09D 133/12* (2013.01); *C09D 133/14* (2013.01); *C09D 135/02* (2013.01); *C09D 151/003* (2013.01); *C09D 153/00* (2013.01); *C09D 167/08* (2013.01);
(Continued)

(58) Field of Classification Search
CPC ........ C08F 220/06; C08F 220/18; C08F 2/22; C08F 222/10; C08F 222/12; C08F 222/14; C08F 222/145; C08F 2500/24; C08F 2438/03; C08F 2800/20; C08F 293/005; C08L 2201/54; C08L 35/02; C08L 33/02; C08L 33/04; C08L 33/06; C08L 2201/50; C08L 2205/18; C09D 133/02; C09D 135/02
See application file for complete search history.

(56) References Cited

U.S. PATENT DOCUMENTS

| 5,126,411 A * | 6/1992 | Rauterkus | C04B 26/04 524/457 |
| 9,012,027 B2 * | 4/2015 | Nabuurs | C08F 265/04 427/385.5 |

(Continued)

FOREIGN PATENT DOCUMENTS

| WO | WO 2011/019691 | 2/2011 | |
| WO | WO 2011/073417 | 6/2011 | |
| WO | WO 2011073417 A1 * | 6/2011 | ............ C08F 265/04 |

OTHER PUBLICATIONS https://en.wikipedia.org/wiki/Suspension_polymerization, Feb. 2010.*

(Continued)

*Primary Examiner* — Satya Sastri
(74) *Attorney, Agent, or Firm* — Nixon & Vanderhye P.C.

(57) ABSTRACT

There are described a dispersion of polymeric beads where the beads comprise a copolymer composition comprising (preferably consisting essentially of): copolymers (and processes for making them) comprising (a) at least 8.5 wt-% preferably >=20 wt-% of a higher itaconate diester (preferably dibutyl itaconate—DBI); (b) less than 23 wt-% acid monomer but also sufficient to have an acid value less than 150 mg KOH/g of polymer, (c) optionally with less than 50 wt-% of other itaconate monomers, and (d) optionally less than 77 wt-% of other monomers not (a) to (c). The DBI may be biorenewable. A further embodiment is an aqueous suspension polymerization process for preparing vinyl polymer beads from olefinically unsaturated monomers and a freeradical initiator, where at least 10 wt-% of the monomer is DBI.

11 Claims, No Drawings

(51) Int. Cl.

| | |
|---|---|
| *C08F 220/14* | (2006.01) |
| *C08F 222/14* | (2006.01) |
| *C08F 293/00* | (2006.01) |
| *C09D 153/00* | (2006.01) |
| *C08F 220/06* | (2006.01) |
| *C09D 133/02* | (2006.01) |
| *C09D 133/12* | (2006.01) |
| *C08L 33/02* | (2006.01) |
| *C08L 33/12* | (2006.01) |
| *B05D 3/02* | (2006.01) |
| *B05D 3/06* | (2006.01) |
| *B05D 3/10* | (2006.01) |
| *C08F 22/10* | (2006.01) |
| *C08F 22/38* | (2006.01) |
| *C08F 26/08* | (2006.01) |
| *C09D 133/14* | (2006.01) |
| *C08L 33/10* | (2006.01) |
| *C08L 51/00* | (2006.01) |
| *C08L 67/08* | (2006.01) |
| *C08L 75/04* | (2006.01) |
| *C09D 133/10* | (2006.01) |
| *C09D 151/00* | (2006.01) |
| *C09D 167/08* | (2006.01) |
| *C09D 175/04* | (2006.01) |
| *C08L 35/02* | (2006.01) |
| *C09D 133/08* | (2006.01) |
| *C09D 125/14* | (2006.01) |
| *C09D 175/08* | (2006.01) |
| *C08F 8/32* | (2006.01) |
| *C08F 8/42* | (2006.01) |
| *C08F 8/44* | (2006.01) |
| *C08F 222/04* | (2006.01) |
| *C08L 75/00* | (2006.01) |
| *C08F 220/18* | (2006.01) |

(52) U.S. Cl.
CPC ......... *C09D 175/04* (2013.01); *C09D 175/08* (2013.01); *C08F 222/04* (2013.01); *C08F 2220/1825* (2013.01); *C08F 2438/03* (2013.01); *C08F 2800/20* (2013.01); *C08F 2810/20* (2013.01); *C08F 2810/50* (2013.01); *C08L 75/00* (2013.01); *C08L 2201/52* (2013.01); *Y02P 20/582* (2015.11); *Y10T 428/31551* (2015.04); *Y10T 428/31786* (2015.04); *Y10T 428/31935* (2015.04); *Y10T 428/31938* (2015.04)

(56) References Cited

U.S. PATENT DOCUMENTS

2008/0188616 A1* 8/2008 Scharz-Barac et al. ...... 524/786
2011/0144265 A1* 6/2011 Durant .................... 524/533
2015/0010863 A1* 1/2015 Nabuurs et al. ......... 430/109.31

OTHER PUBLICATIONS

International Search Report for PCT/EP2013/052171 mailed Mar. 28, 2013.
Written Opinion of the International Searching Authority mailed Mar. 28, 2013.

* cited by examiner

POLYMERIC BEADS, PROCESS AND COMPOSITION

This application is the U.S. national phase of International Application No. PCT/EP2013/052171 filed 4 Feb. 2013 which designated the U.S. and claims priority to EP 12153842.5 filed 3 Feb. 2012; EP 12153840.9 filed 3 Feb. 2012; EP 12153839.1 filed 3 Feb. 2012; EP 12153838.3 filed 3 Feb. 2012; EP 12175782.7 filed 10 Jul. 2012; EP 12175784.3 filed 10 Jul. 2012; EP 12175785.0 filed 10 Jul. 2012; EP 12175786.8 filed 10 Jul. 2012; and EP 12175788.4 filed 10 Jul. 2012; the entire contents of each of which are hereby incorporated by reference.

The present invention relates to polymers and polymeric materials obtained and/or obtainable from certain 2-methylidenebutanedioate diester monomers (also referred to herein as higher itaconate diesters) to a process for making such a polymers and their use to prepare for example coatings, inks and/or adhesives. It is preferred that polymers of the invention, and/or the higher itaconate diesters, are obtained from bio-renewable sources.

Many conventional polymers often suffer from undue sensitivity to water. This is especially true for water based polymer emulsions which can suffer from an increased water sensitivity compared to their solvent borne counterparts. A common way of countering this is to incorporate very hydrophobic monomers, such as butyl acrylate (BA) or 2-ethylhexyl acrylate (EHA). However, as homopolymers from these monomers have an extremely low Tg, incorporation of large amounts of these monomers produces a composition which is very often too soft (low Tg), yet is not sufficient hydrophobic if the amount of these monomer is sufficiently low to produce a satisfactory Tg. This might in turn be mitigated by introduction of high Tg, hydrophobic monomer such as styrene and the like. However polymer compositions comprising stryenic monomers, suffer from reduced outdoor durability because of the inherent UV sensitivity of styrene.

We have now surprisingly found that the dilemma described above can be solved. Good water resistance and low water sensitivity combined with high hardness and high elongation at break may be achieved by introducing higher ester itaconates such as dibutyl itaconate (DBI) as the hydrophobic monomer. Even though these monomers are very hydrophobic, the applicant has unexpectedly found that polymers made from higher itaconate esters do not suffer the same reduction in hardness typically observed for copolymers made from high concentrations of the typical hydrophobic monomers such as butyl acryate (BA) and/or 2-ethyl hexyl acrylate (EHA).

Itaconate ester monomers have been described for very many years. However they have not been widely used to make commercial vinyl polymers because they are expensive and difficult to process. Prior art documents describe the use of itaconate esters only in general terms and typically describe or exemplify lower itaconate diesters such as dimethyl itaconate (DMI). The few documents which describe higher itaconate esters are described below.

U.S. Pat. No. 4,206,292 (Kureha Kagaku Kogyo Kabushiki Kaisha) describes a vinyl chloride resin coating with a smooth surface. The coating comprises: (1) 100 parts of vinyl chloride polymer; and (2) 0.1 to 30 parts of a polymer processing aid comprising: (A) 10 to 100 parts of a copolymer comprising 20 to 99% of an alkyl methacrylate, 1 to 70% of a dialkyl itaconate, and 0 to 60% of a copolymerizable monomer; and (B) 0 to 90 parts of a copolymer comprising 80 to 100% of an alkyl methacrylate, and 0 to 20% of a copolymerizable monomer. The vinyl chloride resins are not prepared from bio-based or other environmentally benign sources. The maximum amount of DBI that is used in the examples is 30% by weight.

U.S. Pat. No. 4,547,428 (Monsanto) describes a terpolymer comprising repeating units derived from an olefin, a diester of an addition polymerizable unsaturated dicarboxylic acid, and a solubilizing monomer which promotes compatibility between the terpolymer and a vinyl halide polymer. A granular form of the processing aid and a method for its preparation are also disclosed. These polymers are not suitable for coating applications and the highest concentration of DBI in the examples is 17% by weight.

U.S. Pat. No. 4,588,776 (Monsanto) describes a polymer composition comprising a blend of a vinyl halide polymer and a particulate terpolymer having a molecular weight of at least 100,000 and a glass transition temperature of at least 50° C. The terpolymer comprises repeating units derived from an olefin, a diester of an addition polymerizable unsaturated dicarboxylic acid, and a solubilizing monomer which promotes compatibility of the terpolymer with the vinyl halide polymer. These polymers are used to prepare shaped plastic articles and not for coating applications. The maximum concentration of DBI used in the examples is 17% by weight.

U.S. Pat. No. 6,951,909 (3M) describes a polymerizable system comprises an organoborane, at least one polymerizable monomer, and a work-life extending agent. These compositions are not suitable for coating applications and the maximum concentration of DBI used in the examples is 17% by weight.

WO11/073,417 (DSM) discloses an aqueous emulsion comprising at least a vinyl polymer, said vinyl polymer comprising: a) 45 to 99 wt-% of itaconate ester monomers having formula (I), wherein R and R' are independently an alkyl or an aryl group; b) 0.1 to 15 wt-% of ionic or potentially ionic unsaturated monomers; c) 0 to 54 wt-% of unsaturated monomers, different from a) and b); and 0.9 to 54.9 wt-% by weight of total monomers of a chaser monomer composition added subsequently and polymerised after the polymerisation of monomers a), b) and c); wherein a)+b)+c) and the chaser monomer composition add up to 100 wt-%; and wherein the aqueous emulsion contains less than 0.5 wt-% free itaconate ester monomers of formula I based on the total weight of the aqueous emulsion. Although it is a stated object of the invention to provide a vinyl polymer with a high total concentration of itaconate ester monomers (see page 2, lines 14 to 17) in practise the larger proportion of such itaconate esters are lower itaconate esters (i.e. esters of small alkyl groups such as DMI). This document does not teach that it would be desirable to use a high concentration of higher itaconate esters (i.e. esters of large alkyl groups such as DBI). Indeed '417 states that itaonate esters are difficult to process (see page 2, lines 23 to 25) which combined with the teaching of the examples demotivates a reader to incorporated large amounts of hydrophobic higher itaconate esters like DBI in a copolymer.

The only examples in '417 that describe use of a DBI monomer are Examples 2, 4, 5 and 6. DBI is used as co-monomer only at a low concentrations in the final copolymer prepared in these Examples (at a maximum of 22.7 wt-%) which are each also prepared with significant amounts of another hydrophobic monomer butyl acrylate (BA). A styrene chaser monomer is always present in the final product (at least 1.5 wt-%). These examples teach away from using DBI or other higher itaconate esters to replace common hydrophobic monomers such as BA, EHA and/or styrene. No significant improvement is seen in film properties such as hardness and water sensitivity of the copolymers prepared in this document.

GB1009486 (Borden) describes a latex of composite polymeric particles where the core and shell may comprise a copolymer of a vinylidene chloride and an ester of an alpha unsaturated aliphatic acid (the amount of ester in the shell being greater than the core). One example (Example 3) describes use of dibutyl itaconate (DBI) as the ester in an total amount of 17% by weight of total monomers (5% in the outer shell and 12% in an inner non core layer). These composite multi-layer polymer particles address a problem of providing a water vapour barrier coating for paper and the like and they use much lower amounts of DBI than the present invention.

U.S. Pat. No. 3,766,112 describes a high gloss latex for floor polish comprising a chlorinated paraffin wax with a polyvinyl pyrrolidone protective colloid. Four monomer components used to prepare the colloid: styrene (70 to 85%), 2-ethylhexyl acrylate (EHA) (5 to 15%) (meth)acrylic acid (3 to 10%) and a fourth monomer (1 to 5%) all percentages by weight of total monomers of the polyvinyl pyrrolidone. One of the seven monomers suggested as the fourth monomer is DBI. These polymers address the problem of providing high gloss floor coatings and DBI is used in much lower amounts than in the present invention.

US2011-144265 (Durant Yvon) describes polymer particles prepared by polymerising esters of itaconic acid in the presence of seed particles to control particle size.

WO2002-068479 (3M) describes polymerisation of (meth)acrylic monomers using a two part initator system of organoborane amine complex and an activator. One of the many different examples (Example 6) is prepared from a low amount of DBI (20% by weight) and this example does not use any other itaconate diester monomer.

WO 2007-026949 (Nippon Cat.) describes emulsion resin compositions that have a minimum film forming temperature (MFT) of ≤0° C. and are free of volatile organic compounds (VOC). These compositions are obtained by mixing a polymer with a high glass transition temperature (high Tg) with a polymer with low Tg. These polymers may be water dispersible and a wide variety of carboxy acid fucnctional acid monomers are suggested to impart such water solubility including itaconic acid, mono-methyl itaconate ester and mono butyl itaconate ester (see page 12 lines 12 to 14). No other itaconic acid derived monomers are described and a reader of this document would have no reason to incorporate (non carboxy-acid functional) itaconate diester monomers.

The esters (including both mono and di-esters) of 2-methylidenebutanedioate (also referred to herein generically as itaconate esters) may be represented by Formula A:

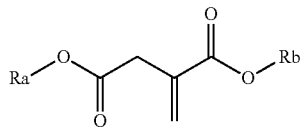

(A)

where Ra and Rb can independently be H or any optionally substituted hydrocarbo moiety (such as any aliphatic, cycloaliphatic or aromatic moieties) provided that Ra and Rb are other than H (which is not an ester but itaconic acid).

It has been found that certain hydrophobic itaconate diesters (e.g. di esters of large alkyl groups) are difficult to use in conventional polymerisation processes (especially in aqueous emulsion polymerisation) and are also expensive. Therefore there has been a reluctance to use such hydrophobic higher itaconate esters at high concentrations in such processes for making vinyl polymer beads.

It is an object of the present invention to solve some or all of the problems identified herein for example by providing polymeric materials made from larger amounts of higher itaconate esters (such as DBI) optionally together with other olefinically unsaturated monomers (also optionally from a biorenewable source). The resultant polymers may have various additional advantages as well as those already described herein such as good film forming at room temperature with the films having high flexibility (elasticity) and good resistance to blocking.

Therefore broadly in accordance with the present invention there is provided a dispersion of polymeric beads where the beads comprise a copolymer composition comprising (preferably consisting essentially of):

(a) greater than 8.5 wt-%, usefully ≥15 wt-%, preferably at least 20 wt-%, more preferably at least 24 wt-%, more preferably at least 30 wt-% for example at least 45 wt-% of at least one monomer represented by Formula 1

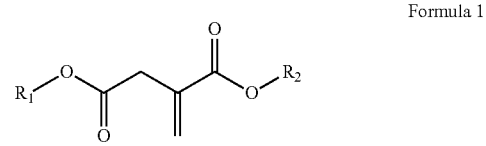

Formula 1 where both $R_1$ and $R_2$ independently represent an optionally substituted hydrocarbo moiety having from 4 to 10 carbon atoms.

(b) optionally at least one hydrophilic monomer preferably in an amount less than 23 wt-%, more preferably 0.5 to 15 wt-%, and also in an amount sufficient that the resultant polymer has an acid value of from 0 to 150 mg KOH/g, preferably less than 150 mg KOH/g, more preferably from 3 to 100 mg KOH per g of polymer, (c) optionally less than 50 wt-%, for example from 0.01 to 10 wt-% and/or one or more monomers represented by Formula 2

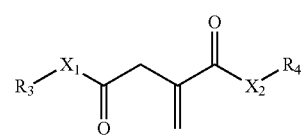

Formula 2

(Formula 2 including itaconate diester monomers being other than those represented by Formula 1)

where $R_3$ and $R_4$ independently represent H or an optionally substituted hydrocarbo moiety having from 1 to 20 carbon atoms $X_1$ and $X_2$ independently represents O or $NR_5$ where $R_5$ denotes H or an optionally substituted hydrocarbo moiety having from 1 to 20 carbon atoms with the proviso that when $X_1$ and/or $X_2$ are O then the respective $R_3$ and/or $R_4$ attached to the oxy group independently represent an optionally substituted hydrocarbo having from 1 to 3 carbon atoms (d) optionally less than 80 wt-%, usefully less than 77 wt-%, preferably less than 75 wt-%, more preferably <70 wt-%, most preferably <65% wt-% of monomers other than components (a), (b) or (c).

where the weight percentages (also denoted herein as "% by weight" and/or "wt-%") of amounts of (a), (b) (c) (d) are calculated as a proportion of the total (weight) amount of (a)+(b)+(c)+(d) which thus totals 100%.

Copolymers of the invention may also be limited by one or more of the following optional provisos:

(I) when component (a) consists of DBI in an amount of less than 30% by weight of the total monomers then the copolymer is substantially free of any chloro groups; and (II) when component (a) consists of DBI in an amount of less than 23% by weight of the total monomers then the copolymer is prepared by other than an emulsion polymerisation method in which a chaser monomer is used; and (III) when component (a) consists of DBI in an amount of less than 23% by weight of the total monomers then if component (d) is present, component (d) is other than styrene or a mixture consisting of butyl acrylate (60 wt-% of mixture) and styrene (40 wt-% of mixture).

(IV) the copolymer is substantially free of styrene (preferably styrene free), more preferably component (d) if present is other than styrene or a mixture consisting of butyl acrylate (60 wt-% of mixture) and styrene (40 wt-% of mixture), more preferably component (d) if present is other than styrene (S), butyl acrylate (BA), 2-ethyl hexyl; acrylate (EHA) or mixtures thereof.

(V) is prepared by other than an emulsion polymerisation method in which a chaser monomer is used; and (VI) the copolymer is prepared by other than an emulsion polymerisation method in which a chaser monomer is used optionally this proviso applying only when component (a) consists of DBI preferably in an amount of from 8.5 to 15% by weight of the total monomers (a)+(b)+(c)+(d).

(VII) when component (a) consists of DBI then component (a) is present in an amount other than 8.5 wt-%, 21.8 wt-%, 22.5 wt-% or 22.7 wt % of the total monomer composition, preferably other than from 8 wt-% to 23 wt %, (VIII) when component (a) consists of DBI then component (a) is present in an amount other than 4.7 wt-%, 5.0 wt-%, 8.5 wt-%, 21.8 wt-%, 22.5 wt-%, 22.7 wt %, 25.0 wt-%, 28.7 wt-%, 30.0 wt-% or 41.2 wt-% of the total monomer composition, preferably other than from 4 wt-% to 42 wt %, (IX) the copolymer is obtained other than from a polymerisation of a dimethyl itaconate (DMI) and dibutyl itaconate (DBI) in the respective weight ratio of 15 to 85 in the presence of poly diethyl itaconate seed polymer; more preferably the copolymer is obtained other than from polymerisation of dialkyl itaconate(s) in the presence of a poly diethyl itaconate seed polymer; most preferably the copolymer is obtained other than from polymerisation in the presence of a poly dialkyl itaconate seed polymer;

(X) if polymerisation of the copolymer occurs in the presence of an initator system comprising organoborane amine complex and an activator then component (a) is present in an amount greater than 20 wt-%, preferably at least 24 wt-% of total monomers (a)+(b)+(c)+(d).

As used herein the term seed polymer is as defined in US2011-144265 (e.g. see paragraph [007]) i.e. a polymer seed particle is dispersed in an aqueous medium such that the seed particle absorbs further added (co)monomer and the seed particle is present at a concentration to allow for control of particle size of that (co)monomer.

Preferably the copolymer composition is an emulsion copolymer (usefully an emulsion polymer prepared where no chaser monomer has been used), more preferably an aqueous emulsion copolymer, most preferably an aqueous coating composition.

A further embodiment is an aqueous suspension polymerisation process for preparing vinyl polymer beads from olefinically unsaturated monomers and a free-radical initiator, where at least 10 wt-% of the monomer is DBI.

Conveniently the composition is substantially free of polyvinyl chloride polymer and/or chlorinated paraffin wax, more preferably is substantially free of any monomer comprising chloro groups, most preferably is substantially free of any species comprising Cl whether as a substituent, atom, di-molecule, ion or otherwise Broadly there is provided in a yet further aspect of the present invention a process for preparing a copolymer comprising the step of polymerising polymer precursors in a polymerisation method the polymer precursors comprising component (a), component (b) and optionally component (c) and/or component (d) as described above.

The polymerisation method may be selected from an emulsion and/or suspension polymerisation though these methods are not preferred. Preferably the copolymer is a dispersion of polymeric beads, where the hydrophilic component (b) is optional, most preferably is absent.

Another aspect of the invention broadly provides for a dispersion of copolymer beads obtained and/or obtainable by a process of the present invention.

Hydrophobic Component (a) (Higher Itaconate Esters)

The present invention is particularly concerned with polymers obtained and/or obtainable from a narrow class of itaconate diester monomers selected from the broad disclosure of general itaconate esters of Formula A. Thus the hydrophobic component (a) comprises itaconate diester(s) of Formula 1:

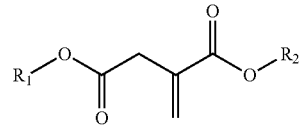

Formula 1 where both $R_1$ and $R_2$ independently represent an optionally substituted hydrocarbo moiety having from 4 to 10, preferably from 4 to 8, more preferably from 4 to 6, most preferably 4 carbon atoms.

The diesters of Formula 1 are also referred to herein as higher itaconate diesters.

Usefully $R_1$ and $R_2$ may independently represent optionally substituted $C_{4-10}$alkyl and/or $C_{4-10}$aryl, more usefully $C_{4-8}$alkyl and/or $C_{4-8}$aryl and most usefully $C_{4-6}$alkyl, even more usefully butyl (n-butyl being especially useful).

Whilst $R_1$ and $R_2$ may be different, more conveniently they represent identical moieties. Especially preferred examples of Formula 1 include those where $R_1$ and $R_2$ are identical, such di(benzyl)itaconate, di(phenyl)itaconate, di-n-butyl itaconate, di-i-butyl itaconate, and/or di-2-ethyl hexyl itaconate. Where $R_1$ and $R_2$ both represent n-butyl Formula 1 represents dibutyl 2-methylidenebutanedioate (also referred to herein as di(n-butyl)itaconate or DBI) which has the following structure:

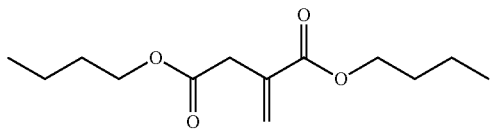 [SMILES: C=C(CC(=O)OCCCC)C(=O)OCCCC]

DBI is the most preferred monomer for use as component (a) in the present invention.

The itaconate functional component (a) is present in the compositions and/or copolymers of the invention in an amount of greater than 8.5% wt-%, usefully ≥15 wt-%, preferably at least 20 wt-%, usefully at least 24 wt-%, more usefully at least 30 wt-%, even more usefully at least 35 wt-% and most usefully at least 40 wt-%, for example at least 50% based on the total weight of monomers (a), (b), (c) and (d) used to prepare the copolymer being 100%.

Conveniently the itaconate functional component (a) may be present in the compositions and/or copolymers of the invention in an amount of less than 80 wt-%, more conveniently less than 70 wt-%, even more conveniently less than 65 wt-%, most conveniently less than 58 wt-%, and for example less than 55 wt-%; based on the total weight of monomers (a), (b), (c) and (d) used to prepare the copolymer being 100%.

Preferably the itaconate functional component (a) may be present in the compositions and/or copolymers of the invention in an amount of from 20 to 80 wt-%, more preferably from 24 to 70 wt-%, even more preferably from 30 to 65 wt-%, most preferably from 35 to 65 wt-%, for example from 40 to 55 wt-% based on the total weight of monomers (a), (b), (c) and (d) used to prepare the copolymer being 100%.

Hydrophilic Component (b) (Acid Functional Monomers)

Suitable hydrophilic monomers of component (b) are those that are co-polymerisible with the hydrophobic monomer(s) of component (a) and are water soluble. Conveniently the at least one hydrophilic monomer of component (b) may comprise at least one activated unsaturated moiety as defined herein.

Usefully the hydrophilic monomer of component (b) is an acid functional ethylenically unsaturated monomer for example an acid functional acrylic monomer.

It will be understood that when referring to acid functional and/or acidic components herein this may relate to acidic moieties and/or potential acidic moieties which under the conditions of use may form acidic groups (e.g. anhydrides). An acid bearing monomer could be polymerised as the free acid or as a salt, e.g. the ammonium and/or alkali metal salt thereof. References herein to acids should therefore also be understood to include suitable salts and/or derivates thereof (such as anhydrides and/or acid chlorides thereof).

Preferred hydrophilic monomers comprise, advantageously consist essentially of, at least one ethylenically unsaturated carboxylic acid although other acid groups such as optionally substituted organo phosphoric and/or sulphonic acids may also be used.

Examples include phosphated alkyl (meth)acrylates, sulphonic acids (and derivatives thereof) of arylalkylenes, sulphonic acids (and derivatives thereof) of alkyl (meth) acrylates and/or other organo substituted sulphonic acids (such as acrylamidoalkyl sulfonic acids).

Preferred arylalkylene sulphonic acids are those where the arylalkylene moiety comprises optionally hydrocarbo substituted styrene, conveniently optionally $C_{1-10}$hydrocarbyl substituted styrene more conveniently optionally $C_{1-4}$alkyl substituted styrene. Useful acids are sulphonic acid substituted derivatives of stryenic compounds selected from the group consisting of styrene, α-methyl styrene, vinyl toluene, t-butyl styrene, di-methyl styrene and/or mixtures thereof. Especially preferred is styrene p-sulphonic acid and its corresponding acid chloride styrene p-sulphonyl chloride.

Preferred phosphated organo acids comprise phosphated (meth)acrylates optionally substituted for example with one or more hydroxyl groups, for example phosphated hydroxy (meth)acrylates and $C_{1-4}$alkyl esters thereof.

Other preferred hydrophilic monomers of component (b) comprises partial acids of multivalent esters, more preferably. half esters of diesters, most preferably mono acid half itaconate esters (i.e. those esters of Formula A where either $R_a$ or $R_b$ is H). Itaconic acid is also another example of a (di)acid functional monomer which is also suitable as component (b).

More preferred acids have one ethylenic group and one or two carboxy groups. Most preferably the acid(s) (and/or suitable acid derivative(s) thereof) are selected from the group consisting of: acrylic acid (and copolymerisable oligomers thereof), beta carboxy ethyl acrylate, citraconic acid, mesaconic acid, crotonic acid, fumaric acid, itaconic acid, maleic acid, methacrylic acid, methylene malonic acid, anhydrides thereof, salts thereof, acid chlorides thereof, combinations thereof in the same species and/or mixtures thereof.

Especially preferred monomers that may comprise component (b) are selected from:
acrylic acid, methacrylic acid, beta carboxy ethyl acrylate, methylene malonic acid, maleic anhydride, itaconic acid, itaconic anhydride, phosphated hydroxylethyl methacrylate (phosphated HEMA), phosphated hydroxylethyl acrylate (phosphated HEA), phosphated hydroxylpropyl methacrylate (phosphated HPMA), phosphated hydroxylpropyl acrylate (phosphated HPA), sulphonated styrene (and its chloride), 2-acrylamido-2-methylpropane sulfonic acid (AMPS) and ethylmethacrylate-2-sulphonic acid.

Particularly preferred acid monomers are acrylic acid, methacrylic acid, beta carboxy ethyl acrylate, itaconic acid, and/or itaconic anhydride.

For emulsion polymerization acrylic acid, methacrylic acid, beta carboxy ethyl acrylate, and/or itaconic acid may be convenient. For SAD copolymerization, acrylic acid, methacrylic acid, and/or itaconic anhydride are preferred.

The hydrophillic monomer component (b) may optionally be absent from the compositions and/or copolymers of the invention but if present is present in an amount of more than a trace amount usefully greater than or equal to 0.1 wt-%, conveniently greater than or equal to 0.5 wt-%, for example greater than 0.8 wt-% based on the total weight of monomers (a), (b), (c) and (d) used to prepare the copolymer being 100%.

Conveniently component (b) if present is present in the compositions and/or copolymers of the invention in an amount of less than 23 wt-%, more conveniently less than or equal to 20 wt-%, even more conveniently less than or equal to 10 wt-%, most conveniently ≤5 wt-%, such as ≤3 wt-%; for example ≤1 wt % based on the total weight of monomers (a), (b), (c) and (d) used to prepare the copolymer being 100%.

Preferably, component (b) may be used in a total amount from 0 to 10 wt-%, more preferably from about 0.1 to about 5 wt-%, even more preferably from about 0.1 to about 3 wt-%, most preferably from about 0.5 to about 1% by weight based on the total weight of monomers (a), (b), (c) and (d) used to prepare the copolymer being 100%.

Conveniently component (b) may be used in a total amount sufficient that the resultant polymer has an acid value (AV) of between 3 and 100 mg KOH per g of solid polymer, preferably from 8 to 80 mg KOH per g, more preferably from 15 to 65 mg KOH per g, and most preferably from 15 to 45 mg KOH per g.

Usefully component (b) satisfies both the acid value (AV) and weight limits herein, but it will be appreciated that depending on the monomer used the AV specified herein may be achieved using weight percentages outside those preferred wt-% values given herein. Where there is an apparent inconsistency herein between any weight % of monomer or other component and the acid values specified it will be appreciated that satisfying the AV is generally the more desirable objective. If necessary the values for weight % of the relevant ingredients can be modified appropriately in a manner well known to a skilled person.

Component (c) (Lower Itaconate Esters and Itaconate Amides)

Component (c) comprises one or more other diester itaconate monomers other than those of Formula 1, preferably a monomer of Formula A where neither Ra nor Rb are H or an optionally substituted $C_{4-10}$hydrocarbo. More preferably component (c) comprises a lower itaconate diester. As used herein the term lower itaconate diester denotes diesters of Formula A where Ra and Rb are independently optionally substituted $C_{1-3}$hydrocarbo groups, such as $C_{1-3}$alkyl, an example of which is dimethyl itaconate (DMI).

Usefully component (c) may comprise lower itaconate diesters (i.e. diesters other than those of Formula 1), and/or higher or lower itaconate amides and thus component (c) may be represented by Formula 2

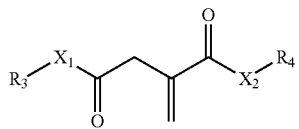

Formula 2 where $R_3$ and $R_4$ independently represent H or an optionally substituted hydrocarbo moiety having from 1 to 20 carbon atoms (e.g. from 1 to 6 carbon atoms); preferably $C_{1-20}$alkyl, preferably $C_{1-6}$alkyl, more preferably $C_{1-4}$alkyl, most preferably $C_{1-3}$alkyl; $X_1$ and $X_2$ independently represents O or $NR_5$ where $R_5$ denotes H or an optionally substituted hydrocarbo moiety having from 1 to 20 carbon atoms (e.g. from 1 to 6 carbon atoms); preferably $C_{1-20}$alkyl, more preferably $C_{1-6}$alkyl; even more preferably $C_{1-4}$alkyl; for example $C_{1-3}$alkyl;
with the proviso that when $X_1$ and/or $X_2$ are O then the respective $R_3$ and/or $R_4$ attached to the oxy group independently represent an optionally substituted hydrocarbo having from 1 to 3 carbon atoms, preferably $C_{1-3}$alkyl.

Components (a), (b), (c) and (d) are mutually exclusive. Thus compounds of Formula 2 are different from those of Formula 1 and the mono acid half itaconate esters are also excluded from Formulae 1 and 2, optionally comprising part of hydrophilic component (b).

Thus in one preferred embodiment of the invention components (a) and (b) (and optionally (c) where present) are each derived from itaconates and/or acids and/or derivatives thereof, more preferably from a biorenewable source. Thus for example component (a) may be a di($C_{4-6}$dialkyl)itaconate, (e.g. DBI), component (b) may be itaconic anhydride itaconic acid, and/or $C_{1-4}$alkyl monoester of itaconic acid and component (c) where present may be a di($C_{1-3}$dialkyl) itaconate (e.g. DMI). In such an embodiment optionally there is no component (d) so the copolymer may advantageously be obtained from monomers from the same itaconate source.

Whilst $R_3$ and $R_4$ may be different, more conveniently they represent identical moieties.

Whilst $X_1$ and $X_2$ may be different, more conveniently they represent identical moieties.

Preferably component (c) may be used in a total amount of less than 35%, more preferably from 0 to 25% by weight.

The component (c) if present may optionally be present in an amount usefully greater than or equal to 0.1 wt-%, conveniently greater than or equal to 0.5 wt-%, for example greater than 1.0 wt-% based on the total weight of monomers (a), (b), (c) and (d) used to prepare the copolymer being 100%.

Conveniently component (c) is present in the compositions and/or copolymers of the invention in an amount of less than 40 wt-%, more conveniently less than or equal to 35 wt-%, even more conveniently less than or equal to 25 wt-%, most conveniently ≤20 wt-%, for example ≤15 wt % based on the total weight of monomers (a), (b), (c) and (d) used to prepare the copolymer being 100%.

Component (c) may be used in a total amount from 0 to 10 wt-%, preferably from 0.01 to 10 wt-%, more preferably from 0.1 to 40 wt-%, even more preferably from 0.5 to 35 wt-%, most preferably from 1.0 to 30 wt-%, for example from 1.0 to 25 wt-% by weight based on the total weight of monomers (a), (b), (c) and (d) used to prepare the copolymer being 100%.

Component (d) (Other Copolymerisable Monomers)

Preferably component (d) comprises monomers not part of components (a), (b) or (c), more preferably that are copolymerisable with them in any suitable technique such as any of those described herein (for example in a SAD and/or an emulsion polymerisation).

Component (d) may comprise a suitable activated unsaturated moiety (such as ethylenic unsaturation) where the structure(s) of component (d) do not overlap with any of components (a), (b) or (c).

Preferably component (d) is used in an amount of less than 50% and more preferably less than 40% by weight.

Component (d) may comprise monomers that can undergo crosslinking, that can improve adhesion of the coating to various substrates, that can enhance the colloidal stability of the polymer emulsion, or that can be used to affect Tg, or polymer polarity.

Conveniently component (d) may comprise (meth)acrylate monomers having alkyl moieties comprising between 1 and 20 carbon atoms, styrene, alpha-methyl styrene, (meth) acrylonitrile, (meth)acryl amide or alkylated (meth)acryl amides, diacetone acryl amide, acetoacetoxyethyl methacrylate, hydroxyethyl (meth)acrylate, hydroxypropyl (meth) acrylate, silane functional monomers, such as 3-methacryloxypropyl trimethoxysilane (Geniosil GF31, ex Wacker), ureido functional monomers, such as Plex 6852-O (ex. Evonik), i-bornyl (meth)acrylate, polyethylene (meth)acrylate, polypropylene (meth)acrylate.

Component (d) may also comprise crosslinking monomers that can induce crosslinking of the copolymer composition. Crosslinking can occur at ambient temperatures (using for instance diacetone acryl amide combined with adipic dihydrazide), at elevated temperatures (stoving conditions in which for instance copolymerized hydroxyethyl (meth)acrylate reacts with hexamethoxy methyl melamines), as 2C composition (copolymerized hydroxyethyl (meth)acrylate reacting with polyisocyanates, such as Bayhydur 3100), or as UV coating (when polymers or oligomers having multiple unsaturated groups are admixed. Typical examples include di- or tri-functional multifunctional acrylates such as trimethylol propane triacrylate or ethoxylated or propoxylated versions thereof).

Optionally component (d) may also comprise least one polymer precursor(s) of Formula 3

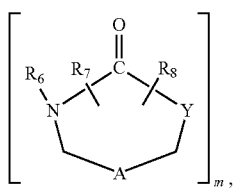

Formula 3 where Y denotes an electronegative group,
$R_6$ is H, OH or an optionally hydroxy substituted $C_{1-10}$hydrocarbo
$R_7$ is H or a $C_{1-10}$hydrocarbo;
$R_8$ is a $C_{1-10}$hydrocarbo group substituted by at least one activated unsaturated moiety; and; either:
A represents a divalent organo moiety attached to both the —HN— and —Y— moieties so the -A-, —NH—, —C(=O)— and —Y— moieties together represent a ring of 4 to 8 ring atoms, and $R_7$ and $R_8$ are attached to any suitable point on the ring; or
A is not present (and Formula 3 represents a linear and/or branched moiety that does not comprise a heterocyclic ring) in which case $R_7$ and $R_8$ are attached to $R_6$; and
m is an integer from 1 to 4.

The ring moiet(ies) of Formula 3 are each attached to $R_8$ and in Formula 3 when m is 2, 3 or 4 then $R_8$ is multi-valent (depending on the value of m). If m is not 1 $R_7$ and —Y— may respectively denote the same or different moieties in each ring, preferably the same respective moieties in each ring. $R_7$ and $R_8$ may be attached at any suitable position on the ring.

Preferred monomers of Formula 3 comprise, conveniently consist essentially of, those where: A represents a optional substituted divalent $C_{1-5}$hydrocarbylene; and
—Y— is divalent —$NR_9$— (where $R_9$ is H, OH, optionally hydroxy substituted $C_{1-10}$hydrocarbo or $R_8$) or divalent O,
More preferred monomers of Formula 3 comprise those where: m is 1 or 2
—Y— is —$NR_8$— (i.e. where Formula 2 is attached to $R_8$ via a ring nitrogen), A represents a divalent $C_{1-3}$hydrocarbylene; $R_6$ is H, $R_7$ is a $C_{1-10}$hydrocarbo; and
$R_8$ comprises a (meth)acryloxyhydrocarbo group or derivative thereof (e.g. maleic anhydride).

Monomers represented by Formula 3 include some monomers informally referred to as ureido monomers. Further suitable ureido monomers of Formula 3 are described in "Novel wet adhesion monomers for use in latex paints" Singh et al, Progress in Organic Coatings, 34 (1998), 214-219, (see especially sections 2.2 & 2.3) and EP 0629672 (National Starch) both of which are hereby incorporated by reference. Conveniently the monomers of Formula 3 may be used as a substantially pure compound (or mixture of compounds) or may be dissolved in a suitable solvent such as a suitable (meth)acrylate or acrylic derivative for example methyl methacrylate.

Other and/or additional component (d) may be used in those cases where higher molecular weights are desired, such as suitable multi functional (meth)acrylates or divinyl aromatics. Typical examples include di-, tri-, or tetra-functional (meth)acrylates, especially difunctional (meth)acrylates and divinyl benzene. Typical concentrations are less than 10%, more preferred less than 5%, even more preferred between 0.05 and 4%, most preferred between 0.1 and 2.5%, and even most preferred between 0.15 and 1.5% by weight based on total monomers.

The component (d) may optionally be present in an amount usefully greater than or equal to 0.1 wt-%, conveniently greater than or equal to 0.5 wt-%, for example greater than 1.0 wt-% based on the total weight of monomers (a), (b), (c) and (d) used to prepare the copolymer being 100%.

Conveniently component (d) is present in the compositions and/or copolymers of the invention in an amount of less than 77 wt-%, more conveniently less than or equal to 50 wt-%, even more conveniently less than or equal to 40 wt-%, most conveniently ≤30 wt-%, for example ≤25 wt % based on the total weight of monomers (a), (b), (c) and (d) used to prepare the copolymer being 100%.

Preferably, component (d) may be used in a total amount from 0 to 77 wt-%, more preferably from about 0.1% to about 50 wt-%, even more preferably from about 0.5% to about 40 wt-%, most preferably from about 1.0% to about 30% by weight based on the total weight of monomers (a), (b), (c) and (d) used to prepare the copolymer being 100%.

Other Aspects of the Invention

One aspect of the invention relates to an aqueous sequential vinyl polymer dispersion comprising 30% by weight (preferably at least 40%) of polymer obtained or obtainable from one or more higher itaconate diester(s).

Another aspect of the invention relates an aqueous vinyl polymer coating compositions comprising blends, copolymers and/or mixtures thereof of an oligomeric component and a polymeric component where the polymeric component comprises 30% by weight (preferably at least 40%) of material obtained or obtainable from one or more higher itaconate diester(s).

A yet other aspect of the invention relates vinyl polymer beads comprising 30% by weight (preferably at least 40%) of polymer obtained or obtainable from one or more higher itaconate diester(s).

Other examples of suitable monomers that may comprises all or part of components (a), (b), (c), or (d) may be described in the various further aspects of the invention later in this application. It will be understood that where suitable such monomers where not already mentioned above may also be used as components in the above aspect of the invention.

Polymerisation Processes

Copolymers of the invention may be formed using a number of processes. These include emulsion polymerisation, suspension polymerisation, bulk polymerisation and solution polymerisation. Such processes are extremely well known and need not be described in great detail.

In one embodiment emulsion polymerisation is used to form copolymers of the invention, although to prepare beads of the invention other polymerisation processes (such as suspension polymerisation) may be preferred.

A conventional emulsion process involves dispersing the monomers in an aqueous medium and conducting polymerisation using a free-radical initiator (normally water soluble) and appropriate heating (e.g. 30 to 120° C.) and agitation.

The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged.

The aqueous emulsion polymerisation can employ conventional free radical initiators such as peroxides, persulphates and redox systems as are well known in the art. The amount of initiator used is generally 0.05 to 3% based on the weight of total monomers charged.

The aqueous emulsion polymerisation process may be carried out using an "all-in-one" batch process (i.e. a process in which all the components to be employed are present in the polymerisation medium at the start of polymerisation) or a semi-batch process in which one or more of the components employed (usually at least one of the monomers), is wholly or partially fed to the polymerisation medium during the polymerisation. Although not preferred, fully continuous processes could also be used in principle. Preferably a semi-batch process is employed.

The polymerisation technique employed may be such that a low molecular weight polymer is formed, e.g. by employing a chain transfer agent such as one selected from mercaptans (thiols), certain halohydrocarbons and alpha-methyl styrene; or catalytic chain transfer polymerisation using for example cobalt chelate complexes as is quite conventional. Alternatively a controlled radical polymerisation process can be used, for instance by making use of an appropriate nitroxide or a thiocarbonylthio compounds such as dithioesters, dithiocarbamates, trithiocarbonates, and xanthates in order to mediate the polymerization via for example a nitrox mediated polymerisation (NMP), a reversible addition fragmentation chain-transfer process (RAFT) or atom transfer radical polymerization (ATRP).

When the copolymer of the invention is an emulsion polymer it may be mixed with a variety of other polymer emulsions such as those that do not comprise DBI (or higher itaconate esters). Examples of such second polymer emulsions can be polyurethane emulsions, polyurethane-poly (meth)acrylate emulsions, alkyd emulsions, polyester emulsions and/or polyvinyl emulsions. This latter group of copolymer emulsions may comprise oligomer-polymer emulsions, gradient morphology emulsions, sequentially polymerized emulsions, or single phase copolymer emulsions.

The emulsions according to the description above can be produced via emulsion polymerization or via a process called solvent assisted dispersion (SAD) polymerization.

When the copolymer emulsion is produced via emulsion polymerization this can be according to a single feed process, a sequentially fed multi-phase copolymerization process, an oligomer supported emulsion polymerization process or a power feed process, resulting in a gradient particle morphology.

In the case of solvent assisted dispersion polymerization process, or SAD polymerization, the polymerization is performed in organic solvents. Next, base and/or surfactant are added and the polymer solution is emulsified. Preferably, the solvent is removed via evaporation at the end of the complete process.

SAD polymer emulsions can be produced via as single feed solution polymerization or by a sequentially fed multi-phase polymerization. It is also envisaged that an SAD polymer emulsion, prior or after the optional removal of the solvent, is used as a seed for an emulsion polymerization stage. In this case, the polymer emulsion prepared according to the SAD process is used as seed in a batch or semi-batch polymerization process.

The preferred polymerization process is emulsion polymerization.

Preferably, the weight average molecular weight ($M_w$) (as determined with GPC as described herein) of the DBI containing copolymers is more than 2000 g/mol, more preferably more than 10,000 g/mol, even more preferably more than 25,000 g/mol, most preferably more than 40,000 g/mol, and even most preferably more than 100,000 g/mol.

In the case of oligomer-polymer emulsions prepared via emulsion polymerization lower molecular weights may be desired. In those cases chain transfer agents may be employed. Typical chain transfer agents can be mercaptans, such as lauryl mercaptan, i-octyl thioglycolate, or 3-mercapto propionic acid, or halogenides, such as bromomethane, bromoethane. Typical chain transfer concentrations in these cases are enough to reduce the weight average molecular weight of the oligomer phase to between 500 and 100,000 g/mol, more preferred between 1,000 and 60,000 g/mol, even more preferred between 2,500 and 50,000 g/mol, and most preferred between 5,000 and 25,000. Typical chain transfer agent concentrations are below 5%, more preferably below 2.5%, and most preferably between 0.5 and 2.5% by weight of total monomer. In the case that the oligomer is combined with a high molecular weight polymer, the preferred molecular weights for the high molecular weight fraction will be as described earlier.

In those cases where the copolymer emulsion comprises multiple phases or is made up from multiple monomer feeds (sequential, oligomer-polymer or power feed) one of the copolymer phases preferably comprises between 10 and 80%, more preferably between 15 and 50%, and most preferably between 20 and 40% by weight of the total monomers used to prepare the sequential, power feed, and/or oligomer-polymer composition. This particular copolymer phase has a Tg, as calculated using the Fox equation, of higher than 40° C., more preferably higher than 60° C., and most preferably higher than 80° C. The other copolymer phase(s) may then comprise between 20 and 90% of the total monomers more preferably between 50 and 85%, and most preferably between 60 and 80% by weight of the total monomers used to prepare the sequential, power feed, and/or oligomer-polymer composition. These particular copolymer phase(s) have a Tg, as calculated using the Fox equation, of less than 40° C., more preferably of less than 20° C., and most preferably of less than 0° C.

The difference in Tg in such emulsions between that of the high Tg phase(s) and that of the low Tg phase(s) is preferably at least 20° C., more preferably at least 30° C., and most preferably at least 40° C.

In a special case it is envisaged that the itaconic anhydride which is copolymerized in an SAD copolymerization process can be post modified using chemicals having anhydride reactive groups. The objective in these cases is to introduce special functionalities, such as crosslinking or adhesion promoting groups, while maintaining an acid group that can be used for colloidal stabilization.

Modification of the anhydride groups can occur with any nucleophilic functionality. Preferred functionalities include hydroxyl groups, hydrazide groups, hydrazine groups, semicarbazide groups and amine groups. In all cases, modification will result in the introduction of the moiety attached to the hydroxyl, hydrazide, hydrazine, semi-carbazide or amine group and, simultaneously, of an acid group. The acid group can subsequently be used for emulsifying the copolymer.

The modification can be done with monofunctional hydroxyl groups, hydrazide, or hydrazine, or primary, or secondary amines, but also with di-functional or higher functional hydroxyl, hydrazine, hydrazide, semi-carbazide, or primary or secondary amines. Potential hydroxyl functionalities can include C1-C20 aliphatic, aromatic, or cycloaliphatic mono-, di-, or high functional alcohols. The aliphatic, aromatic, or cycloaliphatic groups can include other functionalities that can, for instance, be used for improved adhesion, crosslinking or other purposes. Typical examples of such functionalities can include phosphate, phosphonate, sulphate, sulphonate, ketone, silane, (cyclic) ureido, (cyclic) carbonate, hydrazide, hydrazine, semi-carbazide, urethane, urea, carbamate, and melamine The preferred (poly)amines, (poly)hydrazines, or (poly) hydrazides can be characterized by the same description.

In the case where the copolymer composition is prepared via emulsion polymerization, the pH of the emulsion can preferably be increased using organic or inorganic bases. Typical examples include ammonia, primary and secondary organic amines, lithium hydroxide, sodium hydroxide or potassium hydroxide, sodium carbonate or sodium bicarbonate. Typically, the pH is increased only at the end of the manufacturing process, although it can be envisaged that either at the start of the polymerization the pH of the aqueous phase is already increased (buffered) or that the pH of a polymerizing mixture is increased for instance between sequential monomer feeds. In the case of copolymers prepared via emulsion polymerization the pH is preferably increased at the end of the manufacturing process, preferably using ammonia or lithium hydroxide.

Typically, the pH is raised to values above 5, more preferred above 6, and most preferred to values of between 6 and 9.

When the copolymer emulsion is prepared via the SAD polymerization process, emulsification can be done by addition of surfactants, but is preferably done by first neutralizing the polymer acid groups. This can be done by addition of base to the solution polymerized polymer followed by the addition of water or by addition of base to an aqueous phase followed by the addition of the polymer solution. In both cases, suitable bases are the same as above. Preferred bases are ammonia, lithium hydroxide or dimethyl ethanol amine, diethanol methyl amine, diethanol ethyl amine, diethyl ethanol amine and the like. Typically, the molar ratio of base to acid groups is between 0.5 and 1.3, more preferred between 0.6 and 1.2, most preferred between 0.6 and 1.

The concentration of volatile organic compounds (VOC) in the aqueous copolymer emulsions is preferably low. In a preferred case, the VOC level is below 20 wt-%, more preferred below 10 wt-%, even more preferred below 5 wt-%, most preferred below 1 wt-%, and even most preferred below 0.5 wt-%. Intentionally, the VOC level of the copolymer emulsions, prior to formulating them into paints, is close to 0 wt-%, typically below 0.1 wt-%.

When the copolymer composition is prepared via SAD polymerization, solvents are required for the solution polymerization process. Typical solvents include organic solvents that are well known to those experienced in the field, such as acetone, methyl ethylketone, ethanol, methanol, i-propanol, i-octyl alcohol, xylene, glycol ethers, glycol esters. Preferably solvents are used that—following polymerization at elevated pressure—can be removed from the emulsion by evaporation. Preferred solvents in this respect are acetone and methyl ethylketone.

Initiators are required to start the radical polymerization. These, too, are well known to those experienced in the field. The aqueous emulsion polymerisation can employ conventional free radical initiators such as peroxides, persulphates and redox systems. Useful examples include inorganic peroxides, such as ammonium persulphate, sodium persulphate, potassium persulphate, AZO initiator, such as azobisisobutyronitrile (AIBN), 2,2'-azodi(2-methylbutyronitrile) (AMBN), and organic peroxide and hydroperoxides. (Hydro)peroxide can readily be used in combination with suitable reducing agents. Preferably, initiators are used in an amount of between 0.05 and 6%, more preferably between 0.5 and 4%, most preferably from 0.5 to 3% by weight of the total monomers.

Surfactants are used in emulsion polymerization as known to those skilled in the art. Typical surfactants have been extensively described in all kinds of patent applications. The choice and concentration of surfactants are not deemed to be critical for this invention. The aqueous emulsion polymerisation can be effected with conventional emulsifying agents (surfactants) being used such as anionic and/or non-ionic emulsifiers. The amount used is preferably low, preferably 0.3 to 2% by weight, more usually 0.3 to 1% by weight based on the weight of total monomers charged to make the polymer.

In the case of SAD copolymer emulsions, emulsification can be aided by selecting the right anionic, nonionic and mixed anionic/nonionic surfactant(s). Typically, surfactant is used in an amount of less than 5% more preferably less than 3%, and most preferably between 0.2 and 2.5% by weight of the total monomers.

Preferably (and subject to the provisos herein) in one embodiment of the invention the process of making a copolymer emulsion of the invention comprises using a chaser monomer composition as described in WO2011073417. In another embodiment a chaser monomer may optionally not be used.

In a preferred case the residual monomer content of the copolymer emulsion is below 2000 mg/L, more preferred below 1500 mg/L, most preferred below 1000 mg/L, and especially preferred below 550 mg/L.

The aqueous coating composition yields coatings with typical Konig hardness values of at least 30 s, more preferred at least 40 s, even more preferred at least 50 s, and most preferred at least 60 s.

In another embodiment the polymer of the invention may be made using a bulk polymerisation process. Bulk polymerisation of olefinically unsaturated monomers is described in detail in EP 0156170, WO82/02387, and U.S. Pat No. 4,414,370 the contents of which are hereby incorporated by reference.

In general in a bulk polymerisation process a mixture of two or more monomers are charged continuously into a reactor zone containing molten vinyl polymer having the same ratio of vinyl monomers as the monomer mixture. The molten mixture is maintained at a preset temperature to provide a vinyl polymer of the desired molecular weight. The product is pumped out of the reaction zone at the same rates as the monomers are charged to the reaction zone to provide a fixed level of vinyl monomer and vinyl polymer in the system. The particular flow rate selected will depend upon the reaction temperature, vinyl monomers, desired molecular weight and desired polydispersity.

For polymers of the invention especially those to be used in coating compositions, providing amino functional groups thereon may also be useful as such groups provide enhanced adhesion to certain substrates, such as wood and alkyd resins. Amino groups may be incorporated into a polymer by using a carboxyl functional precursor for example prepared by employing ethylenically unsaturated acid functional monomer(s) such as acrylic acid or methacrylic acid. At least some of the carboxy-functional groups may be converted to amino groups (as part of amino ester groups) by reaction with alkylene imines such as ethylene imine, propylene imine or butylene imine. Such a reaction is well established in the art, being known as an imination reaction and the details of this are for example taught in U.S. Pat. No. 7,049,352 the contents of which are hereby incorporated herein by reference. Therefore a further aspect of the invention comprises iminated versions of the all the copolymers of the present invention as described herein.

If it is desired to crosslink polymers (for example in a polymer dispersion), the relevant polymers can carry functional groups such as hydroxyl groups and the dispersion subsequently formulated with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking by virtue of forming covalent bonds.

Another aspect of the invention is described as follows including the specific additional and/or sub-problems it is designed to address and additional prior art.

Traditional coatings may be unsatisfactory because the polymer films possess little flexibility and the coatings on substrates, such as wood, which are not dimensionally stable; tear and chip off. A disadvantage of hard polymer dispersions is that they can only be processed with the addition of large amounts of film formation assistants that are disadvantageous to initial block resistance.

The initial block resistance is the tendency of the freshly applied coatings which have dried for only a short time to block. This tendency to block makes it virtually impossible, for example, for coated substrates to be stacked rapidly, and is due to the large amounts of film formation assistants which are still present in the binder film and are released only gradually by the conventional polymers at room temperature. When drying is carried out at room temperature, the final block resistance is frequently reached only after several days.

EP 387664 discloses an aqueous synthetic resin dispersion having a minimum film forming temperature below 50° C. containing an emulsion polymer with a core/shell structure consisting of A) 65-90 percent by weight of a weakly crosslinked core polymer having a glass transition temperature below 0° C. and an extension at break of at least 150 percent and B) 10-35 percent by weight of an essentially non-crosslinked shell polymer having a glass transition temperature below 60° C., the glass transition temperature of said core polymer being at least 10° C. below that of said shell polymer.

U.S. Pat. No. 5,021,469 discloses a binder, for water based gloss paints contains, dispersed in a aqueous phase, particles of a multiphase emulsion polymer made up of (a) core material having a glass transition temperature exceeding 40° C. and (b) a shell material having a glass transition temperature of less than 70° C.

U.S. Pat. No. 4,654,397 discloses a process for the preparation of aqueous polymer dispersions which have a low film-forming temperature but still give films having a high block resistance, and the use of these polymer dispersions as binders for coating materials.

None of the above-discussed disclosures teaches a dispersion having the selected combination of features and integers as defined below to produce the advantageous combination of properties as discussed above.

This aspect of the invention has as its preferred object to provide a physically-drying binder in the form of an aqueous synthetic resin dispersion which physically dries at low temperatures to give highly elastic films which are more or less non-tacky from the beginning.

The emulsion polymers according to this aspect of the invention address some or all of the problems described herein.

The designation of the polymer phase involved as a first phase or core material and second phase or shell material does not mean that the invention should be bound by any particular morphology of the latex particles. The term polymer phase is to be understood as meaning a portion of the emulsion polymer which is prepared during a temporally-limited segment of the emulsion polymerization and the dispersion of which differs from that of the foregoing or following phase. This is also known as a multi-stage polymerization.

The two-phase structure of the dispersions of the invention influences the properties of the film formed when the dispersion dries after coating a substrate.

This aspect of the invention provides an aqueous vinyl polymer dispersion with an advantageous combination of MFFT and anti-blocking properties which can be prepared at least in part from bio-renewable monomers (such as biorenewable DBI).

According to this aspect of the present invention there is provided an aqueous polymer dispersion having a minimum film forming temperature below 50° C., more preferably below 30° C. comprising a vinyl polymer derived from olefinically unsaturated monomers, with at least two phases comprising:
A) 40 to 90 wt-%, more preferably 50 to 85 wt-% and especially 60 to 80 wt-% of a vinyl polymer A having a glass transition temperature in the range of from −(minus)50 to 30° C.; and
B) 10 to 60 wt-%, more preferably 15 to 50 wt-% and especially 20 to 40 wt-% of a vinyl polymer B having a glass transition temperature the range of from 50 to 130° C.; where
  (i) at least one of the monomers used to prepare vinyl polymer A and/or vinyl polymer B is represented by Formula 1 as described herein (usefully a higher itaconate ester such as DBI) preferably in an amount from 20 to 80 wt-%, more preferably from 20 to 65 wt-%, most preferably 30 to 55 wt-% of the total monomers
  (ii) optionally 10% by weight (preferably at least 20 wt-%) of the total amount of monomer used to form vinyl polymer A and vinyl polymer B is derived from at least one bio-renewable olefinically unsaturated monomer;
where the weight percentage of monomers in A and B are calculated in (i) and (ii) based on the total amount of olefinically unsaturated monomers used to prepare polymer A and polymer B being 100%;

(iii) vinyl polymer A comprises 0.1 to 10 wt-% of at least one acid-functional olefinically unsaturated monomer where the weight percentage of acid functional monomer is calculated based on the total amount of olefinically unsaturated monomer used to prepare polymer A being 100%.

In this aspect of the invention features (i) and (iii) correspond respectively to components (a) and (b) of the present invention and the other monomers used to prepare polymers A and B corresponding to optional components (c) and/or (d) as appropriate.

Other preferred features of this aspect of the present invention are given below and/or in the claims.

The acid-functional olefinically unsaturated monomer may be selected from the group consisting of acrylic acid, methacrylic acid, itaconic anhydride, maleic anhydride methylene malonic acid, itaconic acid, crotonic acid and fumaric acid.

Vinyl polymer A may comprise 0.1 to 20 wt-% of at least one crosslinking olefinically unsaturated monomer, preferably 0.4 to 6 wt-% of at least one olefinically unsaturated monomer with a wet-adhesion promoting functionality.

The crosslinking monomer(s) and wet adhesion promoting monomer(s) can be used together in the same polymer composition. It is, however, often desired to use either crosslinking monomer(s) or wet adhesion promoting monomer(s) in any phase. This means that vinyl polymer A can comprise crosslinking monomer(s) or wet adhesion promoting monomer(s), while vinyl polymer contains wet adhesion promoting monomer(s) or crosslinking monomer(s). In addition to this it is also possible to use wet adhesion promoting monomer(s) in either vinyl polymer A and/or vinyl polymer B or in both and no crosslinking monomer(s) or to use crosslinking monomer(s) in vinyl polymer A and/or vinyl polymer B and no wet adhesion promoting monomer(s).

Olefinically unsaturated monomer with a wet-adhesion promoting functionality contain wet-adhesion promoting functional groups such as acetoacetoxy groups and optionally substituted amine or urea groups, for example cyclic ureido groups, imidazole groups, pyridine groups, hydrazine or semicarbazide groups.

The bio-renewable olefinically unsaturated monomers may comprise bio-renewable (meth)acrylic acid and or bio-renewable alkyl (meth)methacrylate.

The bio-renewable olefinically unsaturated monomers may also comprise bio-renewable: α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

The bio-renewable monomers may also comprise bio-renewable: N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; dialkyl itaconamides, mono alkyl itaconamides; furfuryl (meth)acrylate; and fatty acid functional (meth)acrylates.

Vinyl polymer A and vinyl polymer B may comprise at least about 1.5 dpm/gC of carbon-14.

In a further aspect of the present invention provides a process for preparing the aqueous polymer dispersion (or polymer A and polymer B as described above) which process comprises steps:

a) a first polymerization step, to form a first phase vinyl polymer;
b) a second polymerization step in the presence of the resulting first phase vinyl polymer from step a) to form a second phase vinyl polymer.

Vinyl polymer A may be the first phase in which case vinyl polymer B is the second phase. Alternatively vinyl polymer B may be the first phase in which case vinyl polymer A is the second phase. Preferably vinyl polymer A is the first phase. Preferably the second phase vinyl polymer is prepared in the presence of the first phase vinyl polymer.

Optionally the process includes c) a neutralisation step before/after or during step c) to solubilise the first polymer phase.

Optionally the process includes d) the addition of a crosslinking agent after the polymerization step a) and/or step b), said crosslinking agent being reactable with any crosslinking functional groups of vinyl polymer A and/or vinyl polymer B on subsequent drying of the coating dispersion to effect covalent bond crosslinking.

Optionally the process includes a post treatment imination step e) with alkylene imines like for instance propylene imine) which can greatly improve wet adhesion.

A film, polish, varnish, lacquer, paint, ink and/or adhesive may comprise the aqueous polymer dispersion comprising polymer A and polymer B described above and these aqueous polymer dispersions may also be used protective coatings on wood, plastic, paper and/or metal substrates.

An embodiment of the invention provides an aqueous polymer dispersion where vinyl polymers A and B comprise individually at least 30 wt-%, more preferably at least 40 wt-%, most preferably at least 60 wt-%, and especially preferably at least 70 wt-% of compounds of Formula 1 such as higher itaconate diesters for example DBI. Although the concentration of itaconate monomers in polymers A and B can be similar, it is preferred that the concentrations are different. In each of the preferred cases described above, it is envisaged that the concentration of itaconate monomers in the other phase can always be below 20 wt-% or even be 0 wt-%.

Preferably the concentration of itaconate esters according to the invention in the low Tg phase is at least 10 wt-% higher than that in the high Tg phase, more preferably at least 20 wt-%.

In yet another preferred embodiment of the invention there is provided an aqueous polymer emulsion according to the invention where the monomer feed making up polymer A or the feed making up polymer B comprise up to 20 wt-% of organic solvent, more preferably less than 10 wt-%, even more preferably less than 5 wt-%, and most preferably between 0.1 and 2.5 wt-%.

Improved properties of the copolymers of the this aspect of the invention may include heat resistance, colloidal stability, pigment compatibility, surface activity, blocking resistance and reduced MFFT depending on the monomers used.

The monomer system used for the preparation of vinyl polymer A and vinyl polymer B is any suitable combination of olefinically unsaturated monomers which is amenable to copolymerisation (including bio-renewable monomers described herein which may of course also be acid-functional, crosslinkable etc at described below).

Preferably vinyl polymer A comprises 0.5 to 9 wt-%, more preferably 1 to 8 wt-% and especially 1.5 to 5 wt-% of at least one acid-functional olefinically unsaturated monomer.

Preferably vinyl polymer B comprises less than 5 w % of any acid functional monomers and preferably less than 2 w %, and in some preferred embodiments none at all.

Other, non-acid functional, non-crosslinking monomers which may be copolymerized with the acid monomers include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5-C12) cycloalkyl acrylates such as isobornyl acrylate and cyclohexylacrylate. Also included are (meth)acrylamide, and mono- or di-alkyl amides of (meth)acrylic acid. Styrenes include styrene itself and the various substituted styrenes, such as .alpha.-methyl styrene and t-butyl styrene. Nitriles such as acrylonitrile and methacrylonitrile may also be polymerised, as well as olefinically unsaturated halides such as vinyl chloride, vinylidene chloride and vinyl fluoride.

Functional monomers which impart crosslinkability (crosslinking monomers for short) include epoxy (usually glycidyl) and hydroxyalkyl (usually C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. In principle the functional monomer used for imparting crosslinkability could be acid-bearing monomer, but this is not usual.

Preferably vinyl polymer A comprises 0.1 to 3 wt-% of at least one crosslinking monomer containing at least two olefinically unsaturated groups.

Preferably vinyl polymer A comprises 0.1 to 20 w %, preferably 1 to 15 w %, and particularly 1 to 10 w % of crosslinking monomers.

Adhesion promoting monomers include amino, urea, or N-heterocyclic groups. As known to those skilled in the art this property can also be achieved by imination i.e. reaction of the acid groups with propylene imine.

Preferably vinyl polymer A comprises 0.4 to 6 wt-% of at least one olefinically unsaturated monomer with a wet-adhesion promoting functionality, more preferably between 0.5 and 4 wt-%.

Vinyl polymer A preferably has a weight average molecular weight ($M_w$) as determined with GPC of from 20,000 to 6,000,000 g/mol, preferably more than 80,000 g/mol and most preferably more than 100,000 g/mol. More preferably the upper limit does not exceed 4,000,000 g/mol.

Vinyl polymer B preferably has a weight average molecular weight ($M_w$) as determined with GPC of from 20,000 to 6,000,000 g/mol, preferably more than 80,000 g/mol and most preferably more than 100,000 g/mol. More preferably the upper limit does not exceed 4,000,000 g/mol.

Preferably vinyl polymer A has a glass transition temperature in the range of from –(minus)20 to 20° C.

Preferably vinyl polymer B has a glass transition temperature in the range of from 65 to 110° C.

Preferably the polymer dispersion contains latex particles having a diameter from 30 to 900 nanometers (nm), particularly 60 to 300 nm. The particle size distribution can be unimodal, bimodal, or polymodal. Dispersions having bi- or poly-modal particle size distributions can be made according to the method described in DE3147 008 or U.S. Pat. No. 4,456,726.

In a preferred embodiment there is provided an aqueous polymer dispersion having a minimum film forming temperature of below 30° C. comprising a vinyl polymer derived from olefinically unsaturated monomers, with at least two phases comprising:

A) 60 to 80 wt-% of a vinyl polymer A having a glass transition temperature in the range of from –20 to 20° C.; and B) 20 to 40 wt-% of a vinyl polymer B having a glass transition temperature the range of from 65 to 110° C.;

wherein vinyl polymer A comprises 2 to 5 wt-% of at least one acid-functional olefinically unsaturated monomer, and wherein at least 50 wt-% of the monomer composition used to form vinyl polymer A and vinyl polymer B comprises itaconate diesters of Formula 1, preferably from a biorenewable source.

If vinyl polymer A is made in the second phase then preferably vinyl polymer A has at least 80%, more preferably at least 100% and most preferably 110% of the acid value of vinyl polymer B being made in the first phase and this helps to affect the morphology of the particles to get good film formation.

According to an embodiment of the invention there is also provided a process to obtain an aqueous polymer dispersion as defined herein which process comprises steps:

a) a first polymerization step, to form a first phase vinyl polymer;

b) a second polymerization step in the presence of the resulting first phase vinyl polymer from step a) to form a second phase vinyl polymer.

The first phase vinyl polymer may be formed using emulsion polymerisation. Such processes are extremely well known, are described elsewhere in this specification and need not be described further great detail.

If desired the pH of the polymer emulsion can be adjusted to higher values using suitable bases. Examples of which include organic amines such as trialkylamines (e.g. triethylamine, tributylamine), morpholine and alkanolamines, and inorganic bases such as ammonia, NaOH, KOH, and LiOH.

In an embodiment of the invention it is also possible to use a gradient polymerisation process as described in for example EP1434803 to make at least part of the first and second phase. The second phase monomer feed preferably starts after 20 to 80% completion of the first phase monomer feed.

In a preferred embodiment when >30 wt-% of monomers of Formula 1 (such as DBI) are used the monomers are preferably fed into the reactor during polymerisation, with a preferred feed time>60 minutes, more preferably >120 minutes and most preferred >150 minutes.

Preferably, the concentration of unreacted monomer according to Formula 1 during the polymerisation is less than 5 wt-% on total weight of the emulsion, more preferably less than 3 wt-%, most preferably less than 1 wt-%, and typically less than 0.5 wt-% on total weight of the emulsion. The concentration of unreacted monomer(s) other than according to Formula 1 during the polymerisation is less than 5 wt-%, more preferred less than 2.5 wt-%, most preferably less than 1 wt-%, and typically less than 0.3 wt-% on total weight of the emulsion.

Preferably the dispersions of the invention have VOC levels of less than 100 g/L and more preferably less than 80 g/L, most preferably less than 50 g/L and especially less than 20 g/L of volatile organic components (VOC) such as coalescing solvents.

If crosslinking monomers are present then preferably the amount of crosslinking agent that is employed is such that the ratio of the number of crosslinker groups present in the first phase vinyl polymer and (if employed) in the second phase vinyl polymer to the number of reactive groups (for crosslinking purposes) in the crosslinking agent is within the range of from 10/1 to 1/3, preferably 2/1 to 1/1.5.

A crosslinker reactive with a copolymerised crosslinking monomer, if present, is usually combined with the aqueous dispersion by adding it thereto after the preparation of the second phase vinyl polymer (and sometimes just before use of the dispersion), although it may in principle also be combined by performing the polymerisation of the second phase vinyl polymer in the presence of the crosslinking agent. A combination of both incorporation expedients may also in principle be used.

It will be appreciated that vinyl polymer A and optionally vinyl polymer B possess functional groups for imparting latent crosslinkability to the dispersion (i.e. so that crosslinking takes place e.g. after the formation of a coating therefrom) when combined with the crosslinking agent. For example, one or both polymers could carry functional groups such as hydroxyl groups and the dispersion subsequently formulated with a crosslinking agent such as a polyisocyanate, melamine, or glycoluril; or the functional groups on one or both polymers could include keto or aldehyde carbonyl groups and the subsequently formulated crosslinker in step c) could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking by virtue of forming covalent bonds.

According to an embodiment of the invention there is provided a process for the production of the aqueous polymer coating dispersion, which process comprises steps: a') a first polymerization step, to form a first phase vinyl polymer; b') a second polymerization step in the presence of the resulting first phase vinyl polymer from step a') to form a second phase vinyl polymer. Optionally the process includes c') a neutralisation step before/after or during step b'). Optionally the process includes a post treatment imination step d') with alkylene imines like for instance propylene imine) which can greatly improve wet adhesion. Optionally the process includes e') the addition of a crosslinking agent after the polymerization step a') and/or step b'), and preferably after the optional imination step d'), said crosslinking agent being reactable with any crosslinking functional groups of vinyl polymer A and/or vinyl polymer B on subsequent drying of the coating dispersion to effect covalent bond crosslinking (as described herein).

A still another aspect of the invention is described as follows including the specific additional and/or sub-problems it is designed to address and additional prior art.

There is an ever increasing demand to replace or supplement solvent-based polymer coating compositions with aqueous-based counterparts due to the environmental toxicity and flammability problems posed by the use of volatile organic solvents. However, even where aqueous-based polymer compositions have been devised, their production has usually entailed the intermediate use of organic solvents, requiring subsequent removal, or the incorporation of a certain amount of a solvent in the final composition which acts to ensure proper film-formation on coating (known as a coalescing solvent). There is therefore also now increasing pressure to significantly reduce or eliminate the volatile organic content (VOC) in aqueous-based polymer composition syntheses and also provide biorenewable monomers.

In addition, even if one can achieve a solvent-free aqueous polymer coating composition, it has been found difficult to achieve one with a balance of good properties conventionally required in most coating compositions, particularly acceptably high hardness and low minimum film forming temperature (MFFT) of the resulting coating. The coating should also have good water and solvent resistance.

EP0758364 discloses a process for making organic solvent-free aqueous cross-linkable polymer composition comprising an acid-functional polymer A with Tg 10 to 125° C. and having cross-linker functional groups and a polymer B having Tg at least 25° C. below that of polymer A in combination with a crosslinking agent having an advantageous balance of MFFT and Koenig hardness.

EP0758347 discloses a process for making organic solvent-free aqueous cross-linkable polymer composition comprising an acid-functional polymer A with Tg less than 50° C. and having cross-linker functional groups and a polymer B having Tg at least 25° C. above that of the polymer A in combination with a crosslinking agent having an advantageous balance of MFFT and Koenig hardness.

None of the above-discussed disclosures teaches a vinyl polymer coating composition having the selected combination of features and integers as defined in the invention below and an advantageous combination of properties as discussed above, using monomers such as DBI (optionally from a biorenewable source) to make the vinyl polymer.

In this aspect of the invention we provide an aqueous vinyl polymer coating composition with an advantageous combination of MFFT and hardness and which furthermore is prepared at least in part from a monomer of Formula 1 (such as di(n-butyl) itaconate (DBI)), preferably derived from a bio-renewable source.

According to this aspect of the present invention there is provided an aqueous vinyl polymer coating composition comprising at least:

α[alpha]) a vinyl polymer C, comprising:
  i) 1 to 45 wt-% of acid-functional olefinically unsaturated monomers;
  ii) 0 to 20 wt-% of crosslinking-functional olefinically unsaturated monomers; and
  iii) 99 to 50 wt-% of non-acid functional, non-crosslinking monomers selected from the group consisting of olefinically unsaturated monomers and aryl arylalkylene monomers;
where the weight percentages of each of (α[alpha])(i), (α[alpha])(ii) and (α[alpha])(iii) are calculated based on the total of (α[alpha])(i)+(α[alpha])(ii)+(α[alpha])(iii)=100%; and where
said polymer C having a molecular weight within the range of from 1,000 to 150,000 g/mol and an acid value >5 mgKOH/g; and (β[beta])) a vinyl polymer D, comprising:
  i) 0 to 10 wt-%, preferably less than 25 wt-%, of at least one acid-functional olefinically unsaturated monomer;
  ii) 0 to 25 wt-%, preferably less than 25 wt-%, of crosslinking-functional olefinically unsaturated monomers; and iii) 0 to 100-wt-% of non-acid functional, non-crosslinking monomers selected from the group consisting of olefinically unsaturated monomers and aryl arylalkylenemonomers other than a monomer of Formula 1 at least one of β[beta] (i) to (iii) being present; where the weight percentages of each of (β[beta])(i), (β[beta])(ii), (β[beta])(iii) and (β[beta]) (iv) are calculated based on the total of (β[beta])(i)+(β[beta])(ii)+(β[beta])(iii)+(β[beta]) (iv)=100%; and where said polymer D has a molecular weight ($M_w$), as determined by GPC, of at least 80,000 g/mol and an acid value less than 65 mgKOH/g, preferably less than 50 mgKOH/g; more preferably less than 30 mgKOH/g, most preferably less than 20 mgKOH/g, for example less than 10 mgKOH/g wherein I) the weight % of the monomers used to form polymer C (α[alpha])(i), (α[alpha])(ii), and (α[alpha])(iii)=polymer C monomers) and polymer D ((β[beta])(i), (β[beta])(ii), β[beta])(iii) and (β[beta])(iv)=polymer D monomers) when calculated based on the total amount of (α[alpha])(i)+(α[alpha])(ii)+(α[alpha])(iii)+(β[beta])(i)+(β[beta])(ii)+(β[beta])(iii)+(β[beta])(iv)=100% have the weight percentages of:
  for polymer C monomers from 5 to 75%, preferably 5 to 70%; and
  for polymer D monomers from 25% to 95%, preferably from 30% to 90%

II) from 20 to 75 wt-%, preferably from 24 to 60 wt-%, by weight of the total amount of monomers (α[alpha])(i)+(α[alpha])(ii)+(α[alpha])(iii)+(β[beta])(i)+(β[beta])(ii)+(β[beta])(iii)+(β[beta])(iv) used to form polymer C and polymer D comprises at least one monomer of Formula 1 (for example DBI);

III) optionally at least 10%, preferably at least 20%, by weight of the total amount of monomers (α[alpha])(i)+(α[alpha])(ii)+(α[alpha])(iii)+(β[beta])(i)+(β[beta])(ii)+(β[beta])(iii)+(β[beta])(iv) used to form polymer C and polymer D is derived from at least one bio-renewable olefinically unsaturated monomer;

IV) the acid value of polymer C is greater than the acid value of polymer D by at least 10 mgKOH;

V) polymer C and polymer D have a glass transition temperature difference of at least 20° C.;

VI) polymer C is prepared in the presence of polymer D;

VII) said coating composition on drying has a Koenig hardness of at least 20 sec; and VII) said coating composition has a minimum film forming temperature of <55° C.

Preferably polymer C is an oligomer and polymer D is a non-oligomeric polymer.

In this aspect of the invention, feature (β[beta])(iv) corresponds to component (a) of the present invention; features (α[alpha])(i) and (β[beta])(i) correspond to component (b) of the present invention, and the remaining features (α[alpha])(ii), (α[alpha])(iii), (β[beta])(ii) and (β[beta])(iii) correspond as appropriate to optional components (c) and/or (d) of the present invention.

Other preferred features of this aspect of the present invention are given below and/or in the claims.

The acid-functional monomer may be selected from the group consisting of acrylic acid, methacrylic acid, itaconic anhydride, maleic anhydride, methylene malonic acid, itaconic acid, crotonic acid and fumaric acid and monobutyl itaconate.

The bio-renewable monomers may comprise bio-renewable (meth)acrylic acid and or bio-renewable alkyl (meth)acrylate (as well as optionally monomers of Formula 1).

The bio-renewable monomers may also comprise bio-renewable: α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Other suitable bio-renewable monomers may comprise bio-renewable: N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; ialkyl itaconamides, mono alkyl itaconamides; furfuryl (meth)acrylate; and fatty acid functional (meth)acrylates.

Polymer C and/or polymer D may comprise at least about 1.5 dpm/gC of carbon-14.

The composition may additionally comprising a crosslinking agent, being reactable with any crosslinking functional groups of the polymer C and/or polymer D on subsequent drying of the coating composition to effect covalent bond crosslinking. The functional groups for providing crosslinking may be selected from the group consisting of epoxy, hydroxyl, ketone and aldehyde groups. The crosslinking agent may also be selected, depending on the crosslinking functionality in the polymer C and in the polymer D, from the group consisting of a polyisocyanate, melamine, glycoluril, a polyamine, and a polyhydrazide.

The composition may comprise less than 2 wt-% of added surfactant by weight of monomers used to make vinyl polymer C and vinyl polymer D.

The composition may comprise volatile organic compounds (VOC) in an amount of less than 100 g/L, preferably be substantially free of VOC.

A film, polish, varnish, lacquer, paint, ink and/or adhesive may comprise an aqueous coating composition of polymer C and polymer D and these compositions may also be used as a protective coating on a wood, plastic, paper and/or metal substrate.

In a preferred embodiment of the invention the monomers α[alpha]) iii) and β[beta]) iii) comprise individually at least 10 wt-%, more preferably at least 20 wt-%, most preferably at least 30 wt-% and especially preferably at least 50 wt-%, based on the composition of monomers α[alpha]) iii) and β[beta]) iii, of compounds of Formula 2 such as lower di-esters of itaconic acid (in addition to or replacing the higher itaconate diesters such as DBI). Although the concentration of itaconate monomers in α[alpha]) iii) and β[beta]) iii, can be similar, it is preferred that the concentrations are different. In each of the preferred cases described above, it is preferred that the concentration of itaconate monomers in the other phase is 0 wt-%.

Preferably polymer C acts as a (co-)surfactant for the preparation of polymer D.

Preferably the concentration of olefinically unsaturated monomers used to form polymer C are 10 to 65 wt-%, more preferably 15 to 60 wt-% and especially 20 to 55 wt-% by weight of the monomers used to form polymer(s) C and polymer(s) D.

Preferably the concentration of olefinically unsaturated monomers used to form the polymer D are 90 to 35 wt-%, more preferably 85 to 40 wt-% and especially 80 to 45 wt-% by weight of the monomers used to form polymer(s) C and polymer(s) D.

The monomer system used for the preparation of polymer C and polymer D is any suitable combination of olefinically unsaturated monomers which is amenable to copolymerisation (including the bio-renewable monomers described herein which may of course also be acid-functional, crosslinkable etc as described herein).

Acid-functional olefinically unsaturated monomers (used in polymer C preferably in sufficient concentration to render the resulting polymer surface active) may be a monomer bearing an acid-forming group which yields, or is subsequently convertible to, an acid-functional group (such as an anhydride, e.g. methacrylic anhydride or maleic anhydride) or an acid. Examples of such acid functional monomers have already been given as component (b) previously and may also be used in this aspect of the invention.

Typically polymer C comprises 1 to 45 wt-% of acid functional monomers, preferably 3 to 30 wt-% and more preferably 3 to 20 wt-%.

Polymer C may comprise polyethylene glycol (meth) acrylates or their methyl ether analogues that can render polymer C surface active. When copolymerising these monomers, a lower acid concentration can be applied, for example polymer C may then comprise 1 to 10 wt-% of acid functional monomers.

Typically polymer D comprises less than 5 wt-% of any acid functional monomers and preferably less than 2 wt-%, and in some preferred embodiments none at all.

Polymer D may also comprise polyethylene glycol (meth) acrylates or their methyl ether analogues which may contribute to reducing the MFFT of the resulting composition.

Other, non-acid functional, non-crosslinking monomers which may be copolymerized with the acid monomers include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates, such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5-C12) cycloalkyl acrylates such as isobornyl acrylate and cyclohexylacrylate. Also included are (meth)acrylamide, and mono- or di-alkyl amides of (meth)acrylic acid. Styrenics include styrene itself and the various substituted styrenes, such as alpha-methyl styrene and t-butyl styrene. Nitriles such as acrylonitrile and methacrylonitrile may also be polymerised, as well as olefinically unsaturated halides such as vinyl chloride, vinylidene chloride; vinyl fluoride. and (meth)acrylamide.

Typically polymer C comprises 98.5 to 50 wt-% of non acid functional, non-crosslinking monomers, preferably 96 to 65 wt-%, and more preferably 96 to 75 wt-%.

Functional monomers which impart crosslinkability (crosslinking monomers for short) include epoxy (usually glycidyl) and hydroxyalkyl (usually C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual and therefore for the purpose of this invention acid functional monomers are not considered as crosslinkable monomers although they may act as such.

Preferably, polymer C comprises 0.5 to 25 wt-%, more preferably 0.5 to 25 wt-%, most preferably 1 to 15 wt-%, and especially 1 to 10 wt-% of crosslinking monomers.

Preferably polymer C has a weight average molecular weight ($M_w$) as determined with GPC of from 1500 to 100,000 g/mol, more preferably 2000 to 50,000 g/mol and particularly 3,000 to 40,000 g/mol.

The weight average molecular weight ($M_w$) of polymer D as determined with GPC is preferably more than 100,000 g/mol, and most preferably more than 150,000 g/mol. The upper limit does not usually exceed 5,000,000 g/mol.

Preferably the weight average molecular weight ($M_w$) of polymer C is lower than the weight average molecular weight ($M_w$) of polymer D, and most preferably there is a molecular weight difference of at least 30,000 g/mol, especially at least 50,000 g/mol, and typically at least 100,000 g/mol.

Preferably the difference in Tg (expressed as degrees Celsius) between polymer C and polymer D is at least 40 degrees and more preferably at least 60 degrees.

In one embodiment of this aspect of the invention the Tg of polymer C is higher than that of polymer D. In this embodiment the preferred Tg of polymer C is from 50 to 125° C. and particularly from 70 to 125° C. The Tg of polymer C should then be at least 20 degrees higher than, more preferably at least 40 degrees higher than the Tg of polymer D (both expressed as degrees Celsius). Preferably the Tg of polymer D in this embodiment is from –(minus)50 to 40° C. and more preferably from –(minus)30 to 30° C. and especially from –(minus)20 to 30° C.

In another embodiment of the invention the Tg of polymer C is lower than that of polymer D. In this embodiment the preferred Tg of polymer C is less than 50° C. and more preferably is of from –(minus)15 to 49° C. Preferably the Tg of polymer D in this embodiment is from 50 to 125° C. and particularly from 70 to 125° C.

Polymer C may be formed using a number of processes. These include emulsion polymerisation, suspension polymerisation, bulk polymerisation and solution polymerisation. Such processes are extremely well known are described elsewhere in this specification and need not be described further in great detail.

In another embodiment polymer C is made via a bulk polymerisation process. Bulk polymerisation of olefinically unsaturated monomers is described in detail in EP 0156170, WO 82/02387, and U.S. Pat. No. 4,414,370.

In general in a bulk polymerisation process a mixture of two or more monomers are charged continuously into a reactor zone containing molten vinyl polymer having the same ratio of vinyl monomers as the monomer mixture. The molten mixture is maintained at a preset temperature to provide a vinyl polymer of the desired molecular weight. The product is pumped out of the reaction zone at the same rates as the monomers are charged to the reaction zone to provide a fixed level of vinyl monomer and vinyl polymer in the system. The particular flow rate selected will depend upon the reaction temperature, vinyl monomers, desired molecular weight and desired polydispersity.

The minimum reaction temperature will vary, depending on the particular monomers charged to the reactor. In order to obtain a polymer C for use in the invention with the desired molecular weight the reaction temperature is preferably maintained from about 135° C. to about 310° C., more preferably from about 150° C. to 275° C. A conventional free-radical-yielding initiator may be used and optionally a chain transfer agent may be added to control the molecular weight.

Alternatively polymer C may be prepared by means of a suspension or micro-suspension polymerisation process. In this process, monomer and water are introduced into the polymerisation reactor and a polymerisation initiator, along with other chemical additives, are added to initiate the polymerisation reaction. The contents of the reaction vessel are continually mixed to maintain the suspension and ensure a uniform particle size of the resulting polymer.

Polymer C may also be made by a solution dispersion polymerisation or solvent assisted dispersion polymerisation (SAD) process where the polymerisation process can be carried out in the presence of an organic solvent. Typical organic solvents which may be used include aromatic hydrocarbons such as benzene toluene, and the xylenes, ethers such as diethyl ether, tetrahydrofuran, alkoxylated ethylene glycol; alcohols such as methanol, ethanol, propanol, butanol and alcohols with at least six carbons, such as octanol. and their esters with carboxylic acids such as acetic, propionic and butyric acids, ketones such as acetone or methyl ethyl ketone, and liquid tertiary amines such as pyridine. Mixtures of solvents may also be used. Typical solvents would certainly include alkyl glycols, such as butyl glycol or dipropylene glycol dimethyl ether (Dowanol DMM) or dipropylene glycol methyl ether (Dowanol DPM). An example of an aromatic solvent that is regularly used is Solvesso 100. Preferably bio-renewable solvents (for example as available from Liberty Chemicals) are used.

Often the reaction temperature is around 140° C. to 160° C. and can also be a carried out at an elevated pressure so that lower boiling point solvents can be used. An advantage of lower boiling point solvents is that they can be more easily removed in order to make a low VOC aqueous composition.

Preferably the compositions of the invention have VOC levels of less than 100 g/L and more preferably less than 80 g/L, most preferably less than 50 g/L and especially less than 20 g/L of volatile organic components such as coalescing solvents.

Once polymer C is prepared then polymer D is prepared in the presence of polymer C and an aqueous composition is prepared by inter alia solubilising polymer C before during or after the preparation of polymer D. Polymer C can serve as an (co-)emulsifier for polymer D without which polymer D cannot be sufficiently dispersed in the aqueous composition of the invention. By (co-) emulsifier is meant that although polymer C acts as an emulsifier, additional emulsifiers may also be added.

Thus, polymer C contains a sufficient concentration of acid functionality or a high enough concentration of polyethylene glycol (meth)acrylates to render the polymer partially or more preferably fully soluble in aqueous media, if necessary by neutralization of acid groups of the polymer, as would e.g. be achieved by adjustment of the pH of the aqueous medium. (If the acid-functional polymer C is only partially soluble in the aqueous medium of the emulsion, it will exist therein partly dispersed and partly dissolved). Usually, the medium in which the polymer C finds itself will be acidic (pH<7) and the acid groups will be carboxyl groups so that dissolution and surface activity can be affected by raising the pH of the medium (usually the aqueous polymerisation medium in which the polymer C has been prepared) so as to neutralize the acid groups by the addition of a base, such as an organic or inorganic base, examples of which include organic amines such as trialkylamines (e.g. triethylamine, tributylamine), morpholine and alkanolamines, and inorganic bases such as ammonia, NaOH, KOH, and LiOH. Of course, the aqueous medium containing the acid functional polymer A may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pKa 1 to 2) so that neutralization may not be necessary to achieve dissolution. Further still, it is possible for acid monomers to be polymerised in salt form rather than as the free acid.

The solubilization of the polymer C is preferably effected before carrying out the polymerisation of step b') as preferably this produces a product having an improved balance of MFFT and Koenig hardness.

Polymer C is present during the polymerisation process to make polymer D. Polymer D may be formed using a number of processes. These include emulsion polymerisation, bulk polymerisation and solution polymerisation.

A preferred feature of this aspect of the invention is that it is often possible to eliminate or much reduce the requirement for the addition of a surfactant to act as an emulsifier to make polymer D because polymer C itself can fulfil such a function (i.e. act as an emulsifying agent). Thus the aqueous composition of the invention preferably contains a very low level of such added emulsifier (not counting polymer C itself), with usually less than 0.5% (preferably less than 0.25%, and often zero) based on the total wt of monomers charged being used, and with the only surfactant present preferably being that remaining from polymer C polymerisation (not counting the polymer C itself). In fact the overall level of surfactant (not counting the polymer C itself) is preferably <1% more preferably <0.5%, particularly <0.35%, based on the total wt of monomers charged for polymer D.

The polymerisation to make polymer D could be carried out using a chain transfer agent, but (unlike in the preparation of polymer C) is usually effected without the use of such a material in order to ensure a higher molecular weight.

Polymer D may be considered as a hydrophobic polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer hydrophobic and water-insoluble throughout the pH range.

Polymer D may also comprises 0.5 to 25 wt-%, more preferably 0.5 to 20 wt-%, most preferably 1 to 12 wt-%, especially 1 to 8 wt-%, for example 1 to 5 wt-% of crosslinking multifunctional (meth)acrylate monomer(s). In general it will be appreciated that given the respective natures of polymers C and D for a given system the amount of multifunctional (meth)acrylate crosslinking monomer used in polymer C is more likely to be less than the amount used in polymer D.

It will be appreciated that polymer C and optionally polymer D possess functional groups for imparting latent crosslinkability to the composition (i.e. so that crosslinking takes place e.g. after the formation of a coating there from) when combined with the crosslinking agent (as described elsewhere herein).

If crosslinking monomers are present then preferably the amount of crosslinking agent that is employed is such that the ratio of the number of crosslinker groups present in the polymer C and (if employed) in the polymer D to the number of reactive groups (for crosslinking purposes) in the crosslinking agent is within the range of from 10/1 to 1/3, preferably 2/1 to 1/1.5.

Polymers of this aspect of the invention may also be iminated as described elsewhere herein.

The crosslinker is usually combined with the aqueous composition by adding it thereto after the preparation of polymer D (and sometimes just before use of the composition), although it may in principle also be combined by performing the polymerisation of polymer D in the presence of the crosslinking agent. A combination of both incorporation expedients may also in principle be used.

According to an embodiment of the invention there is provided an aqueous polymer coating composition comprising at least:

α(alpha)) a vinyl polymer C, comprising:
  i) 4 to 25 wt-% of acid-functional olefinically unsaturated monomers;
  ii) 0 to 15 wt-% of crosslinking unsaturated monomers; and
  iii) 96 to 60 wt-% of non-acid functional, non-crosslinking olefinically unsaturated monomers; said polymer C being obtained by an emulsion polymerisation process and having a molecular weight within the range of from 3,000 to 65,000 g/mol, a Tg of at least 50° C. and an acid value >20 mgKOH/g; and β(beta)) a vinyl polymer D, made in the presence of neutralised polymer C and comprising:
  i) 0 to 4 wt-%, more preferably 0 wt-% of acid-functional olefinically unsaturated monomers;
  ii) 0 to 12 wt-%, more preferably 1 to 8 wt-% of crosslinking-functional olefinically unsaturated monomers; and
  iii) 100 to 84 wt-% of non-acid functional, non-crosslinking olefinically unsaturated monomers;

wherein polymer D has a molecular weight of at least 80,000 g/mol and a Tg less than 50° C.; and where the wt-% of polymer C is 10 to 60, more preferred 20 to 50 wt-% based on the weight of polymer C and polymer D together; and where polymer(s) C and polymer(s) D combined contain at least 30 wt-% of itaconate diester monomer according to Formula 1.

The wt-% of olefinically unsaturated monomers used to form polymer C are in the range of from 10 to 60, more preferably 20 to 50 wt-% based on the weight of olefinically unsaturated monomers used to form polymer C and polymer D together.

According to an embodiment of the invention there is provided a process for the production of the aqueous polymer coating composition, which process comprises steps:
1) a first polymerisation step, to form polymer C;
2) a second polymerisation step in the presence of the resulting polymer C from step 1) to form polymer D;
3) a neutralisation step before/after or during step 2) to solubilise polymer D;
4) the optional step of iminating (part of) the acid groups using alkylene imine
5) the optional addition of a crosslinking agent after the polymerisation step a) and/or step 2), said crosslinking agent being reactable with any crosslinking functional groups of the polymer C and/or polymer D on subsequent drying of the coating composition to effect covalent bond crosslinking.

In a preferred embodiment the acid functional monomer in polymer C is selected from acrylic acid; methacrylic acid, crotonic acid, itaconic anhydride and itaconic acid; the crosslinking functional monomer used in both polymer C and polymer D is diacetone acrylamide and the crosslinker is adipic acid dihydrazide.

According to another embodiment of the invention there is provided a process for the production of the aqueous polymer coating composition, which process comprises steps:
1) where vinyl polymer C is made by an emulsion polymerisation process,
2) a subsequent neutralisation step; and
3) where subsequently polymer D is made by polymerisation in the presence of polymer C;

wherein both vinyl polymer C and vinyl polymer D comprise at least one carbonyl functional olefinically unsaturated monomer;

wherein the acid value of vinyl polymer C is between 30 and 110 mgKOH/g and the acid value of vinyl polymer D is below 10 mgKOH/g, more preferred below 5 mgKOH/g; and wherein the crosslinker is an aliphatic dihydrazide.

According to yet another embodiment of the invention there is provided a process for the production of the aqueous polymer coating composition, which process comprises steps:
1) where polymer C is made by a bulk polymerisation process and more preferably a continuous bulk polymerisation process,
2) where polymer C is dissipated in water and (partially) neutralised, preferably with an organic amine or NaOH, KOH or LiOH; and
3) where subsequently polymer D is made by polymerisation in an aqueous medium in the presence of the neutralised polymer C;

wherein the acid value of vinyl polymer C is between 40 and 300 mgKOH/g of solid polymer;

wherein polymer C has a Tg of at least 70° C. and more preferably at least 90° C.; and wherein polymer C has a molecular weight in the range of from 2,000 to 25,000 g/mol.

According to yet a further embodiment of the invention there is provided a process for the production of the aqueous polymer coating composition, which process comprises steps:
1) where polymer C is made by solution polymerisation, preferably in a solvent selected from the group consisting of acetone, methyl ethylketone, ethanol, isopropanol or mixtures thereof;
2) a subsequent neutralisation step comprising neutralising at least part of the acid groups with a base (preferably an organic amine), adding water and emulsifying polymer C
3) where subsequently polymer D is made by emulsion polymerisation in the presence of polymer C;
4) where the solvent is removed by evaporation;

wherein polymer C has a Tg of at least 50° C.,
wherein polymer D has a Tg of no more than 50° C., and
wherein polymer c and polymer D have a glass transition temperature difference of at least 25° C.

In yet another embodiment there is provided an aqueous copolymer composition according to this aspect of the invention wherein polymer D contains between 0.1 and 1.5 wt-% of a multi unsaturated monomer, preferably divinyl benzene.

It is preferred that most of the higher itaconate ester present in the composition is used to prepare polymer D rather than polymer C. Therefore in yet still another embodiment there is provided an aqueous copolymer composition according to this aspect of the invention wherein polymer D contains at least 50 wt-%, more preferably at least 75 wt-%, of all itaconate monomer according to Formula 1 present in the total copolymer composition, and polymer C contains no more than 50 wt-%, more preferably not more than 25 wt-% of all itaconate monomer according to Formula 1 present in the total copolymer composition.

Preferably the average particle size of the aqueous composition of the invention is between 70 and 140 nm.

The solids content of an aqueous composition of the invention is usually within the range of from about 20 to 65 wt-% on a total weight basis, more usually 30 to 55 wt-%. Solids content can, if desired, be adjusted by adding water or removing water (e.g. by distillation or ultrafiltration).

A still yet another aspect of the invention is described as follows including the specific additional and/or sub-problems it is designed to address.

The present invention relates to vinyl polymer beads comprising at least 20 wt-% (preferably at least 30 wt-%) of a monomer of Formula 1 (usefully DBI) preferably from a bio-renewable source and to such vinyl polymer beads as well as a process for making them and their use in coatings, inks and adhesives.

Vinyl polymers which are prepared with emulsion polymerisation technology allow a good control over critical polymer parameters like molecular weight, particle size in the nm (nanometer) range (typically 50-300 nm) and residual monomer content. However, few micron-sized particles are obtained during emulsion polymerisation. Due to the small particle size dried emulsion vinyl polymers have a much larger dusting tendency compared to dried vinyl polymer beads obtainable by suspension polymerization. On the other hand polymer emulsions used as such to avoid the dusting issue need to be preserved to prevent bacterial or fungal growth.

The problem of dustiness of dried emulsion polymers can be overcome by bead-type suspension polymerisation which is a well known method of polymerisation in which the polymer formed is obtained as micron sized spherical beads or pearls. Even though the water soluble by-products may be removed with the stationary water phase during the final de-watering and washing cycle the water insoluble by-products such as in particular the unreacted monomers stay within the polymer beads and lead to characteristic off odours, lowered glass transition temperatures ($T_g$) and toxicological issues, especially when the monomers are taken from vinyl acid/methyl vinyl acid and their esters.

An object of this aspect of the present invention is to solve some or all of the problems or disadvantages (such as identified herein) with the prior art.

By the term "polymer beads" in connection with the present invention is meant polymer particles that are simple to isolate e.g. by filtering or centrifuging. The polymer beads in connection with the present invention are micron-sized, for example. typically have an average diameter of at least 50 μm (micron), preferably at least 150 μm (micron). Generally, the beads have an average diameter between 50 and 1500 μm (micron), and more preferably between 150 to 600 μm (micron).

As used herein the term 'micron sized' denotes an object that has at least one linear dimension having a mean size between about 0.1 μm (1 μm=one micron=$1\times10^{-6}$ m) to about 2000 μm. A preferred mean size for the micron-sized materials described herein is less than about 1000 μm (micron), more preferably less than about 600 μm (micron) most preferably less than about 500 μm (micron), for example less that about 200 μm (micron). Micron-sized materials exist with the micron-size in three dimensions (micro-particles), two dimensions (micro-tubes having a micro-sized cross section, but indeterminate length) or one dimension (micro-layers having a micro-sized thickness, but indeterminate area). Usefully the present invention relates to materials that comprise micro-particles. The particle size values given herein may be measured by a Coulter LS230 Particle Size Analyser (laser diffraction) and are the volume mean. The particle sizes are quoted as a linear dimension which would be the diameter of an approximate spherical particle having the same volume as the volume mean measured.

Such vinyl polymer beads are widely applied in the field of coatings (e.g. road markings, marine coatings), adhesives, colorants, photographic applications, inks, powder coatings or plastics filler and even in personal care products if the residual monomer content is low enough. The beads may be used in a liquid medium which may be aqueous or solvent based. Preferably if a solvent is used, a bio-renewable solvent is used. Bio-renewable solvents include for example bio-alcohols, xylene, butyl acetate, ethyl acetate, ethyl lactate and the VertecBio™ solvents available from Liberty Chemicals.

The preparation of vinyl polymer beads is well known and is described in for example EP739359 which discloses the use of a cobalt chelate for Mw control and in U.S. Pat. No. 4,463,032 which discloses polymers in bead form which are conventionally produced by a bead (suspension) polymerisation method where with this method, the monomers (disperse phase) are dispersed in a non-solvent (continuous phase) by mechanical action (agitation) and polymerised in that form.

Thus, this aspect of the invention provides a process for preparing vinyl polymer beads having a molecular weight in the range of from 3,000 to 500,000 g/mol and a glass transition temperature in the range of from 30° C. to 175° C. and an acid value less than 150 mgKOH/g, preferably from 0 to 100 mgKOH/g; said process comprising aqueous suspension polymerisation of olefinically unsaturated monomers using a free-radical initiator, wherein at least 20 wt-% of the olefinically unsaturated monomers used comprises at least one monomer of Formula 1 (preferably di(n-butyl) itaconate (DBI), more preferably derived from a bio-renewable source.

The monomers of Formula 1 correspond to the component (a) of the process of present invention, and any acid functional monomers used to achieve the desired AV correspond to component (b) of the present invention; and the remaining monomers that may be used correspond as appropriate to optional components (c) and/or (d) of the process of the present invention.

Other preferred features of this aspect of the present invention are given below and/or in the claims.

A process for preparing vinyl polymer beads as described herein where the olefinically unsaturated monomers are biorenewable and also comprise at least one monomer are selected from the group consisting bio-renewable (meth) acrylic acid and or bio-renewable alkyl (meth)acrylate.

Preferred bio-renewable monomers are selected from the group consisting of bio-renewable: α-methylene butyrolactone, α-methylene valerolactone, α-methylene γ-$R^1$ butyrolactone ($R^1$ can be an optionally substituted alkyl or optionally substituted aryl); itaconates such as dialkyl itaconates and monoalkyl itaconates, itaconic acid, itaconic anhydride, crotonic acid and alkyl esters thereof, citraconic acid and alkyl esters thereof, maleic anhydride, methylene malonic acid and its mono and dialkyl esters, citraconic anhydride, mesaconic acid and alkyl esters thereof.

More preferred bio-renewable monomers are selected from the group consisting of bio-renewable: N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; ialkyl itaconamides, mono alkyl itaconamides; furfuryl (meth)acrylate; and fatty acid functional (meth)acrylates.

The above process may further comprise the isolation of the beads followed by a drying step at 40 to 100 C optionally carried out over a period of 3 to 40 hours.

Vinyl polymer beads obtained and/or obtainable by this process forms a further aspect of the invention.

The vinyl polymer beads of the invention and/or the copolymers that comprise them may additionally have one or more of the following preferred properties: comprise at least about 1.5 dpm/gC of carbon-14.
have an acid value (AV) from 0 to 20 mgKOH/g, more preferably either in on embodiment from 45 to 65 mg KOH/g, or an alternative embodiment from 100 to 150 mg KOH/g.

A still yet other aspect of the invention provides a composition comprising the vinyl polymer beads of the invention and a carrier.

A another aspect of the invention provides a method of coating a surface of a substrate with a composition comprising vinyl beads comprising the steps of applying the composition to the surface and then drying the composition. Suitable substrate may be selected from the group consisting of tarmac, wood, plastic, metal and paper.

Compositions comprising the vinyl polymer beads of the invention may be used as a bio-renewable liquid medium in a coating composition.

The respective ratio of the weight of dispersed phase to the weight of the continuous phase may be from 10/90 to 50/50 and more preferably from 30/70 to 45/55.

In another embodiment, the invention relates to vinyl polymer beads obtainable by the process according to this aspect of the invention. In particular the vinyl polymer beads according to the invention have a residual monomer content of less than 2500 ppm and more preferably less than 1000 ppm.

The vinyl polymer beads according to the invention are prepared by suspension polymerisation (also known as granular, bead, or pearl polymerisation due to the shape of the resultant polymer particles) according to known methods in the art as illustrated in the examples.

Initiators for polymerizing the monomers to provide the vinyl polymer beads of the invention are those which are normally suitable for free-radical polymerisation of acrylate monomers and which are oil-soluble and have low solubility in water such as e.g. organic peroxides, organic peroxyesters and organic azo initiators. The initiator is generally used in an amount of about 0.1 to 2 wt-% based on the total monomer content.

Useful chain transfer agents include mercapto-acids and alkyl esters thereof, carbon tetrabromide, mixtures thereof and cobalt chelate. Dodecylmercaptane is preferred. The mercapto chain transfer agent generally is used in an amount of about 0.01 to 3.0 wt-%, preferably in an amount of 0.1 to 2 wt-% based on the total monomer content. Typical cobalt chelate levels used range from 1 to 200 ppm and more preferably from 10 to 100 ppm.

Optionally, a water soluble inhibitor can be added to inhibit polymerisation in the water phase in order to prevent the formation of too much polymer by emulsion and/or solution polymerisation in the water phase, which can result in bead agglomeration or emulsion type polymerization. Suitable inhibitors include those selected from thiosulfates, thiocyanates, water soluble hydroquinones and nitrites. When used, the water soluble inhibitor can generally be added in an amount of from about 0.01 to about 1 parts by weight based on 100 parts total monomer content.

Furthermore, a water soluble or water dispersible polymeric stabiliser is needed to stabilize the suspension and in order to obtain stable beads. The stabiliser is preferably a synthetic water soluble or water dispersible polymer such as e.g. polyvinylalcohol, gelatine, starch, methylcellulose, carboxymethylcellulose, hydroxyethylcellulose, poly(meth)vinyl acid and their sodium salts, and the like. The stabiliser is preferably used in an amount of about 0.001 to 10 wt-%, more preferably in an amount of about 0.01 to 1 wt-% based on the total monomer content.

Other additives can optionally be used such as e.g. mono-, di- and trivalent metal salts, borax, urea, glyoxal and urea formaldehyde resin. Biocides (both bactericides and fungicides) can also be added, in order to prevent microbial growth in the finished product and during its use in water based systems.

The monomers, free-radical initiator, and any optional materials can be mixed together in the prescribed ratio to form a premix. The stabiliser can be combined with water and then with the premix to form an oil in water suspension. The resulting suspension typically comprises from about 10 to about 50 weight percent monomer premix and from about 90 to about 50 weight percent water phase. Bead-type suspension polymerisation in accordance with the present invention is typically a thermally initiated polymerisation and is preferably carried out with agitation for about 2 to about 16 hours at a temperature between about 40° C. and 90° C.

After isolation of the beads according to standard methods such as filtration or centrifugation the beads are preferably subjected to an extended drying, preferably at about 40 to 100° C. depending on the actual Tg of the final polymer composition. The drying can be performed by commonly known means to a person skilled in the art such as e.g. using a fluidised bed dryer or a conventional oven. The drying time can be easily adjusted by a person skilled in the art and is usually carried out over a period of from about 3 to about 40 hours, more usually from 8 to 20 hours and in particular from 8 to 10 hours.

In a preferred embodiment the process further comprises the isolation of the vinyl polymer beads followed by the step of drying at a temperature of from 40 to 100° C. and more preferably from 80 to 100° C.

In addition to the monomers of Formula 1 (such as higher itaconate esters e.g. DBI), other monomers that may be used to prepare copolymers of the invention comprise:
unsaturated monomers belonging to the general class of methacrylates, e.g. $C_{1-30}$alkyl irrespective of the functionality;
unsaturated monomers belonging to the general class of acrylates, e.g. $C_{1-30}$alkyl irrespective of the functionality;

unsaturated hydrocarbon monomers like e.g. butadiene, isoprene, styrene, vinyl toluene, α-methyl styrene, tert.-butyl styrene etc.;
unsaturated monomers belonging to the class of vinyl halides, vinyl esters, vinyl ethers;
multi-olefinically unsaturated monomers such as di-allyl-phthalate, allylmethacrylate; and/or
any multi unsaturated monomers of any of the aforementioned types.

Preferably the monomers that are other than of Formula 1 are also derived from a bio-renewable source.

Improved properties of beads of the present invention may include heat resistance, colloidal stability, pigment compatibility, surface activity, blocking resistance and reduced MFFT depending on the monomers used.

The monomer system used for the preparation of the vinyl polymer beads may comprise in addition to those of Formula 1 any suitable combination of olefinically unsaturated monomers which is amenable to copolymerisation (including the bio-renewable monomers described herein which may of course also be acid-functional, crosslinkable etc at described below).

Acid-functional olefinically unsaturated monomers include a monomer bearing an acid-forming group which yields, or is subsequently convertible to, such an acid-functional group (such as an anhydride, e.g. methacrylic anhydride or maleic anhydride). Examples of such acid functional monomers have already been given as component (b) previously and may also be used in this aspect of the invention.

Other, non-acid functional, non-crosslinking monomers which may be copolymerised with the acid monomers include acrylate and methacrylate esters and styrenes; also dienes such as 1,3-butadiene and isoprene, vinyl esters such as vinyl acetate, and vinyl alkanoates. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5-C12) cycloalkyl acrylates such as isobornyl acrylate and cyclohexylacrylate. Styrenes include styrene itself and the various substituted styrenes, such as .alpha.-methyl styrene and t-butyl styrene. Nitriles such as acrylonitrile and methacrylonitrile may also be polymerised, as well as olefinically unsaturated halides such as vinyl chloride, vinylidene chloride and vinyl fluoride.

Functional monomers which impart crosslinkability (crosslinking monomers for short) include epoxy (usually glycidyl) and hydroxyalkyl (usually C1-C12, e.g. hydroxyethyl)methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide. The purpose of using such functional monomer is to provide subsequent crosslinkability in the resulting polymer system as discussed. (In principle the functional monomer used for imparting crosslinkability could be acid-bearing monomer, but this is not usual) and for the purpose of this invention acid-bearing monomers are not considered as crosslinking monomers.

In an especially preferred embodiment of the invention is provided a vinyl copolymer prepared via suspension polymerization comprising at least 10 wt-% on total copolymer composition of mono- or diesters of itaconic acid (in addition to the DBI). More preferably the total content of mono- or diesters of itaconic acid (including the DBI) is at least 20 wt-%, more preferably 25 wt-%, even more preferably at least 30 wt-%, most preferably at least 40 wt-%, and especially preferably at least 50 wt-%.

The vinyl polymer beads made according to the present invention preferably have a molecular weight in the range of from preferably 5,000 to 100,000 g/mol.

The vinyl polymer beads made according to the present invention preferably have a glass transition temperature in the range of from 35° C. to 150° C. and more preferably in the range of from 50° C. to 115° C.

The vinyl polymer beads made according to the present invention preferably have a an average particle size of about 50 to 500 μm (micron) more preferably from 200 to 500 μm (micron).

The vinyl polymer beads made according to the present invention in one embodiment preferably have an acid value of from 0 to 20 mgKOH/g.

The vinyl polymer beads of the invention may be used in coating compositions but also in printing compositions and/or personal care compositions The vinyl polymer beads made according to the present invention in another embodiment preferably have an acid value of from 45 to 65 mgKOH/g when used for printing compositions.

The vinyl polymer beads made according to the present invention in another embodiment preferably have an acid value of from 100 to 150 mgKOH/g when used for personal care compositions.

The term "activated unsaturated moiety", is used herein to denote a species comprising at least one unsaturated carbon to carbon double bond in chemical proximity to at least one activating moiety. Preferably the activating moiety comprises any group which activates an ethylenically unsaturated double bond for addition thereon by a suitable electrophillic group. Conveniently the activating moiety comprises oxy, thio, (optionally organo substituted)amino, thiocarbonyl and/or carbonyl groups (the latter two groups optionally substituted by thio, oxy or (optionally organo substituted) amino). More convenient activating moieties are (thio)ether, (thio)ester and/or (thio)amide moiet(ies). Most convenient "activated unsaturated moieties" comprise an "unsaturated ester moiety" which denotes an organo species comprising one or more "hydrocarbylidenyl(thio) carbonyl(thio)oxy" and/or one or more "hydrocarbylidenyl (thio)-carbonyl(organo)amino" groups and/or analogous and/or derived moieties for example moieties comprising (meth)acrylate functionalities and/or derivatives thereof. "Unsaturated ester moieties" may optionally comprise optionally substituted generic α,β-unsaturated acids, esters and/or other derivatives thereof including thio derivatives and analogs thereof.

Preferred activated unsaturated moieties are those represented by a radical of Formula 4.

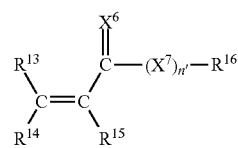

Formula 4 where n' is 0 or 1, $X^6$ is oxy or, thio; $X^7$ is oxy, thio or $NR^{17}$ (where $R^{17}$ represents H or optionally substituted organo), $R^{13}$, $R^{14}$, $R^{15}$ and $R^{16}$ each independently represent a bond to another moiety in Formula 1, H, optional substituent and/or optionally substituted organo groups, where optionally any of $R^{13}$, $R^{14}$, $R^{15}$ and $R^{16}$ may be linked to form a ring; where at least one of $R^{13}$, $R^{14}$, $R^{15}$ and $R^{16}$ is a bond; and all suitable isomers thereof, combinations thereof on the same species and/or mixtures thereof.

The terms "activated unsaturated moiety"; "unsaturated ester moiety" and/or Formula 4 herein represents part of a formula herein and as used herein these terms denote a radical moiety which depending where the moiety is located in the formula may be monovalent or multivalent (e.g. divalent).

More preferred moieties of Formula 4 (including isomers and mixtures thereof) are those where n' is 1; $X^6$ is O; $X^7$ is O, S or $NR^7$.

$R^{13}$, $R^{14}$, $R^{15}$ and $R^{16}$ are independently selected from: a bond, H, optional substituents and optionally substituted $C_{1-10}$hydrocarbo, optionally $R^{15}$ and $R^{16}$ may be linked to form (together with the moieties to which they are attached) a ring; and where present $R^{17}$ is selected from H and optionally substituted $C_{1-10}$hydrocarbo.

Most preferably n' is 1, $X^6$ is O; $X^7$ is O or S and $R^{13}$, $R^{14}$, $R^{15}$ and $R^{16}$ are independently a bond, H, hydroxy and/or optionally substituted $C_{1-6}$hydrocarbyl.

For example n' is 1, $X^6$ and $X^7$ are both O; and $R^3$, $R^4$, $R^5$ and $R^6$ are independently a bond, H, OH, and/or $C_{1-4}$alkyl; or optionally $R^5$ and $R^6$ may together form a divalent $C_{0-4}$alkylenecarbonyl$C_{0-4}$alkylene moiety so Formula 4 represents a cyclic anhydride (e.g. when $R^{15}$ and $R^{16}$ together are carbonyl then Formula 4 represents a maleic anhydride or derivative thereof).

For moieties of Formula 4 where n' is 1 and $X^6$ and $X^7$ are both O then when one of ($R^{13}$ and $R^{14}$) is H and also $R^{13}$ is H, Formula 4 represents an acrylate moiety, which includes acrylates (when both $R^{13}$ and $R^{14}$ are H) and derivatives thereof (when either $R^{13}$ and $R^{14}$ is not H). Similarly when one of ($R^{13}$ and $R^{14}$) is H and also $R^{15}$ is $CH_3$, Formula 4 represents an methacrylate moiety, which includes methacrylates (when both $R^{13}$ and $R^{14}$ are H) and derivatives thereof (when either $R^{13}$ and $R^{14}$ is not H). Acrylate and/or methacrylate moieties of Formula 5 are particularly preferred.

Conveniently moieties of Formula 4 are those where n' is 1; $X^6$ and $X^7$ are both O; $R^{13}$ and $R^{14}$ are independently a bond, H, $CH_3$ or OH, and $R^{15}$ is H or $CH_3$; $R^{16}$ is H or $R^{15}$ and $R^{16}$ together are a divalent C=O group.

More conveniently moieties of Formula 4 are those where n' is 1; $X^6$ and $X^7$ are both O; $R^{13}$ is OH, $R^4$ is $CH_3$, and $R^{15}$ is H and $R^6$ is a bond and/or tautomer(s) thereof (for example of an acetoacetoxy functional species).

Most convenient unsaturated ester moieties are selected from: —OCO—CH=$CH_2$; —OCO—C($CH_3$)=$CH_2$; acetoacetoxy, —OCOCH=C($CH_3$)(OH) and all suitable tautomer(s) thereof.

It will be appreciated that any suitable moieties represented by Formula 4 could be used in the context of this invention such as other reactive moieties.

Vinyl Polymer

Whilst the term vinyl polymer is commonly used to refer to thermoplastic polymers derived by polymerization from compounds containing the vinyl group ($CH_2$=CH—), the term "vinyl polymer" is used herein more broadly to denote any polymer (whether thermoplastic or not) that comprises (e.g. as repeat units therein) and/or is derived from monomers and/or polymer precursors comprising one or more of the following moieties: activated unsaturated moieties (such as acrylates and/or methacrylates); any olefinically unsaturated moieties (such as vinyl moieties); mixtures thereof; and/or combinations thereof within the same moiety.

There is an increasing demand to use bio-renewable monomers in order to improve the sustainability of the polymers used in for example coating applications. In view of concerns about depletion of fossil fuel resources or an increase in carbon dioxide in the air that poses a global-scale environmental problem in recent years, methods for producing raw materials of these polymers from biomass resources have attracted al lot of attention. Since these resources are renewable and therefore have a carbon-neutral biomass, such methods are expected to gain in particular importance in future. It is therefore a preferred feature of the present invention and the aspects described herein that where possible the monomers (especially the higher itaconate diesters such as DBI) as far as possible are biorenewable.

Preferably at least 30 wt-%, more preferably at least 50 wt-%, and especially 70 wt-% of the olefinically unsaturated monomers used to form the polymers of the invention are derived from at least one bio-renewable olefinically unsaturated monomer. Bio-renewable monomers may be obtained fully or in part from bio-renewable sources. Thus it is preferred to also measure the carbon-14 content to determine the biorenewability.

The content of carbon-14 (C-14) is indicative of the age of a bio-based material. It is known in the art that C-14, which has a half life of about 5,700 years, is found in bio-renewable materials but not in fossil fuels. Thus, "bio-renewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof.

C-14 levels can be determined by measuring its decay process (disintegrations per minute per gram carbon or dpm/gC) through liquid scintillation counting. In one embodiment of the present invention, polymer A, polymer B and/or the olefinically unsaturated monomer(s) that are used to obtain polymer A and/or polymer B may considered sufficiently biorenewable for the purposes of this embodiment of the invention when the respective polymer A, polymer B and/or olefinically unsaturated monomer comprise an amount of carbon-14 to produce a decay of at least about 1.5 dpm/gC (disintegrations per minute per gram carbon), more preferably at least 2 dpm/gC, most preferably at least 2.5 dpm/gC, and especially at least 4 dpm/gC.

It is preferred that the higher itaconate diesters such as DBI are biorenewable, however other monomers used in the present invention may also be biorenewable. Examples of bio-renewable monomers include but are not limited to bio-based acrylics obtained by for example using bio-derived alcohols such as bio-butanol and include (meth)acrylic acid and alkyl (meth)acrylate, where alkyl is preferably selected from methyl, ethyl, butyl or 2-ethylhexyl.

Acrylic acid can be made from glycerol, as is disclosed by Arkema, or from lactic acid as described by U.S. Pat. No. 7,687,661. Methacrylic acid can be prepared from ethene, methanol and carbon monoxide (all bio-renewable), as disclosed by Lucite International Ltd.

Olefinically unsaturated bio-renewable monomers which may additionally provide a contribution to improved coating properties include α-methylene butyrolactone, α-methylene valerolactone, α-methylene γ-$R^3$ butyrolactone ($R^3$ can be an optionally substituted alkyl or optionally substituted aryl); itaconates such as dialkyl itaconates (including DBI) and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof.

Other non-acid functional, non-crosslinking monomers include diesters of itaconic acid. Preferred examples of such monomers include dimethyl itaconate, diethyl itaconate, di-n-propyl itaconate, di-i-propyl itaconate, di-n-butyl itaconate, di-i-butyl itaconate, and di-2-ethyl hexyl itaconate.

Another useful set of useful bio-renewable monomers include N—$R^2$, α-methylene butyrolactam ($R^2$ can be an optionally substituted alkyl or optionally substituted aryl); N—$R^2$, α-methylene γ-$R^1$ butyrolactam; N-alkyl itaconimids; itaconmonoamids; itacondiamids; ialkyl itaconamides, mono alkyl itaconamides; furfuryl (meth)acrylate; fatty acid functional (meth)acrylates such as DAPRO FX-522 from Elementis and Visiomer® MUMA from Evonik.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The object of the present invention is to solve some or all of the problems or disadvantages (such as identified throughout the application herein) with the prior art.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/ or suitable end products.

Preferred utility of the present invention comprises as a coating composition.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

Thus for example a substance stated as present herein in an amount from 0 to "x" (e.g. in units of mass and/or weight %) is meant (unless the context clearly indicates otherwise) to encompass both of two alternatives, firstly a broader alternative that the substance may optionally not be present (when the amount is zero) or present only in an de-minimus amount below that can be detected. A second preferred alternative (denoted by a lower amount of zero in a range for amount of substance) indicates that the substance is present, and zero indicates that the lower amount is a very small trace amount for example any amount sufficient to be detected by suitable conventional analytical techniques and more preferably zero denotes that the lower limit of amount of substance is greater than or equal to 0.001 by weight % (calculated as described herein).

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

In the present invention, unless the context clearly indicates otherwise, an amount of an ingredient stated to be present in the composition of the invention when expressed as a weight percentage, is calculated based on the total amount of monomers in the composition being equivalent to 100% (thus for example components (a)+(b)+(c)+(d) total 100%). For convenience certain non monomer ingredients (such as for example chain transfer agents (CTA)) which fall outside the definitions of any of components (a) to (d) may also be calculated as weight percentages based on total monomer (i.e. where the weight of total monomers alone is set at 100%). As the weight % of monomers (for example for components (a) to (d)) by definition total 100% it will be seen that using monomer based weight % values for the non-monomer ingredients (i.e. those components outside (a) to (d)) will mean the total percentages will exceed 100%. Thus amounts of non-monomer ingredients expressed as monomer based weight percentages can be considered as providing a ratio for the weight amounts for these ingredients with respect to the total weight of monomers which is used only as a reference for calculation rather than as a strict percentage. Further ingredients are not excluded from the composition when (a)+(b)+(c)+(d) total 100% and weight percentages based on total monomers should not be confused with weight percentages of the total composition.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, even more preferably no more than 5%, most preferably no more than 2%, especially no more than 1.5%, for example about 0% (e.g. completely absent or if present only in an undetectable amount) of the relevant whole.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valences of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valences of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valences of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, π-adducts, solvates and/or hydrates); isotopically substituted forms, polymeric configurations [such as homo or copolymers, random, graft and/or block polymers, linear and/or branched polymers (e.g. star and/or side branched), cross-linked and/or networked polymers, polymers obtainable from di and/or tri-valent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality. It will be understood that unless the context dictates otherwise term monomer as used herein encompasses the term polymer precursor and does not necessarily exclude monomers that may themselves be polymeric and/or oligomeric in character.

A monomer is a substantially monodisperse compound of a low molecular weight (for example less than one thousand daltons) which is capable of being polymerised.

A polymer is a polydisperse mixture of macromolecules of large molecular weight (for example many thousands of daltons) prepared by a polymerisation method, where the macromolecules comprises the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the term polymer may or may not encompass oligomer.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or cross linking with such other resins as appropriate.

Another aspect of the invention broadly provides a coating composition comprising the polymers and/or beads of the present invention and/or as described herein.

A further aspect of the invention provides a coating obtained or obtainable from a coating composition of the present invention.

A yet other aspect of the invention broadly provides a substrate and/or article having coated thereon an (optionally cured) coating composition of the present invention.

A yet further aspect of the invention broadly provides a method of using polymers of the present invention and/or as described herein to prepare a coating composition.

A still further aspect of the invention broadly provides a method for preparing a coated substrate and/or article comprising the steps of applying a coating composition of the present invention to the substrate and/or article and optionally curing said composition in situ to form a cured coating thereon. The curing may be by any suitable means, such as thermally, by radiation and/or by use of a cross-linker.

Preferred coating compositions are solvent coating compositions or aqueous coating compositions, more preferably are aqueous coating compositions.

Optionally aqueous coating compositions may also comprise a co-solvent. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of polymers of the invention or may have been added during formulation of the aqueous composition.

The compositions of the invention are particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The compositions of the invention may be used in various applications and for such purposes may be optionally further combined or formulated with other additives and/or components, such as defoamers, rheology control agents, thickeners, dispersing and/or stabilizing agents (usually surfactants and/or emulsifiers), wetting agents, fillers, extenders, fungicides, bacteriocides, coalescing and wetting solvents or co-solvents (although solvents are not normally required), plasticisers, anti-freeze agents, waxes, colorants, pigments, dyes, heat stabilisers, levelling agents, anti-cratering agents, fillers, sedimentation inhibitors, UV absorbers, antioxidants, reactive diluents, neutralising agents, adhesion promoters and/or any suitable mixtures thereof.

The aforementioned additives and/or components and the like may be introduced at any stage of the production process or subsequently. It is possible to include fire retardants (such as antimony oxide) to enhance fire retardant properties.

The compositions of the invention may also be blended with other polymers such as vinyl polymers, alkyds (saturated or unsaturated), polyesters and or polyurethanes.

The coating composition of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The coating compositions of the invention may also be used, appropriately formulated if necessary, for the provision of films, polishes, varnishes, lacquers, paints, inks and adhesives. However, they are particularly useful and suitable for providing the basis of protective coatings for substrates that comprise wood (e.g. wooden floors), plastics, polymeric materials, paper and/or metal.

The carrier medium may be removed from the compositions of the invention once they have been applied to a substrate by being allowed to dry naturally at ambient temperature, or the drying process may be accelerated by heat. Crosslinking can be developed by allowing to stand for a prolonged period at ambient temperature (several days) or by heating at an elevated temperature (e.g. 50° C.) for a much shorter period of time.

Many other variations embodiments of the invention will be apparent to those skilled in the art and such variations are contemplated within the broad scope of the present invention.

Further aspects of the invention and preferred features thereof are given in the claims herein.

Tests

Minimum Film Forming Temperature

The minimum film forming temperature (MFFT) of a dispersion as used herein is the temperature where the dispersion forms a smooth and crack free coating or film using DIN 53787 and when applied using a Sheen MFFT bar SS3000.

Spot Tests

Coating films formed by blends of the invention can be tested in well known conventional spot tests (such as ASTM D1308-02e1) to determine the resistance of the film to various liquid reagents such as water, ethanol, detergent (e.g. that available commercially from Unilever under the trade mark Andy) and coffee. In one such test a standard volume (e.g. 0.5 ml) of the liquid reagent may be applied to the film to form a spot thereon (e.g. by pipette) which is then covered with a watch glass. After the time specified (e.g. in the tables herein) the film can be assessed and rated visually on a scale of 1 to 5 as described below.

Koening Hardness

Koenig hardness as used herein is a standard measure of hardness, being a determination of how the viscoelastic properties of a film formed from the dispersion slows down a swinging motion deforming the surface of the film, and is measured according to DIN 53157 NEN5319.

Glass Transition Temperature (Tg)

As is well known, the glass transition temperature of a polymer is the temperature at which it changes from a glassy, brittle state to a plastic, rubbery state. The glass transition temperatures may be determined experimentally using Differential Scanning calorimetry (DSC), taking the peak of the derivative curve as Tg, or calculated from the Fox equation. Thus the Tg, in degrees Kelvin, of a copolymer having "n" copolymerised comonomers is given by the weight fractions W of each comonomer type and the Tgs of the homopolymers (in degrees Kelvin) derived from each comonomer according to the equation:

$$\frac{1}{Tg} = \frac{W_1}{Tg_1} + \frac{W_2}{Tg_2} + \ldots \frac{W_n}{Tg_n}$$

The calculated Tg in degrees Kelvin may be readily converted to ° C.

Solids Content

The solids content of an aqueous dispersion of the invention is usually within the range of from about 20 to 65 wt-% on a total weight basis, more usually 30 to 55 wt-%. Solids content can, if desired, be adjusted by adding water or removing water (e.g. by distillation or ultrafiltration).

pH Value

The pH value of the dispersion of the invention can be from 2 to 10 and mostly is from 6 to 9.5.

Blocking

Block Resistance Measurement [Includes Blocking and Early Blocking]:

Step 1: Blocking:

A 100 micron wet film of the aqueous emulsion of the invention to which 10% butyldiglycol is added is cast on to a paper substrate and dried for 16 hours at 52° C.

Step 1: Early Blocking:

A 250 micron wet film of the aqueous emulsion of the invention to which 10% butyldiglycol was added, is cast on to a paper substrate and dried for 24 hours at room temperature.

Step 2: Blocking and Early Blocking:

After cooling down to room temperature two pieces of coated film are placed with the coated side against each other under a load of 1 Kg/cm.sup.2 for 4 hours at 52° C. After this time interval the load on the samples is removed and the samples are left to cool down to room temperature (22+−2° C.). When the two coatings can be removed from each other without any damage to the film (do not stick) the block resistance is very good and assessed as a 5. When they however completely stick together, block resistance is very bad and assessed as a 0.

Gas Chromatography Mass Spectrometry (GCMS)

to confirm polymerisation is substantially complete the content of free itaconate ester monomers content can be determined by GCMS. The GCMS analyses were performed on a Trace GC-DSQ MS (Interscience, Breda, the Netherlands) equipped with a CTC combi Pal robotic autosampler for head space has been used. The carrier gas was Helium and a CP Sil 5 low bleed/MS, 25 m×0.25 mm i.d., 1.0 μm (CP nr. 7862) column has been used.

The GC-oven was programmed from 50° C. (5 min) followed by different sequential temperature ramps of 5° C./min to 70° C. (0 min), 15° C./min to 220° C. (0 min), and ending with 25° C./min to 280° C. (10 min). A continuous Helium flow of 1.2 ml/min was used. A hot split injection at 300° C. was performed on a programmed temperature vaporizer (PTV). The injection volume was 1 μl. The MS transfer line and ion source were both kept at 250° C. The samples were measured with single ion monitoring (SIM). For the specific case of dibutyl itaconate (DBI) the masses 127.0 and 59.0 Da were used, for the internal standard (iso butyl acrylate) the masses 55.0 and 73.0 were applied. The sample solutions were approximately 500 mg in 3 ml of internal standard solution (iso butyl acrylate in acetone). The calibration was performed with 5 different concentration levels from 0 to 500 ppm. The calculation was performed using Microsoft Excel with a linear calibration curve.

Molecular Weight

Unless the context clearly dictates otherwise the term molecular weight of a polymer or oligomer as used herein denotes weight average molecular weight (also denoted as $M_w$). $M_w$ may be measured by any suitable conventional method for example by Gas Phase Chromatography (GPC—performed similarly to the GCMS method described above) and/or by the SEC method described below. GPC method is preferred Determination of Molecular Weight of a Polymer Using SEC The molecular weight of a polymer may also be determined using Size Exclusion Chromatography (SEC) with tetrahydrofuran as the eluent or with 1,1,1,3,3,3 hexafluoro isopropanol as the eluent.

1) Tetrahydrofuran

The SEC analyses were performed on an Alliance Separation Module (Waters 2690), including a pump, auto injector, degasser, and column oven. The eluent was tetrahydrofuran (THF) with the addition of 1.0 vol % acetic acid. The injection volume was 150 μl. The flow was established at 1.0 ml/min. Three PL MixedB (Polymer Laboratories) with a guard column (3 μm PL) were applied at a temperature of 40° C. The detection was performed with a differential refractive index detector (Waters 410). The sample solutions were prepared with a concentration of 20 mg solids in 8 ml THF (+1 vol % acetic acid), and the samples were dissolved for a period of 24 hours. Calibration is performed with eight polystyrene standards (polymer standard services), ranging from 500 to 4,000,000 g/mol. The calculation was performed with Millennium 32 software (Waters) with a third order calibration curve. The obtained molar masses are polystyrene equivalent molar masses (g/mol).

2) 1,1,1,3,3,3 Hexafluoro Isopropanol

The SEC analyses were performed on a Waters Alliance 2695 (pump, degasser and autosampler) with a Shodex RI-101 differential refractive index detector and Shimadzu CTO-20AC column oven. The eluent was 1,1,1,3,3,3 hexafluoro isopropanol (HFIP) with the addition of 0.2M potassium trifluoro acetate (KTFA). The injection volume was 50 μl. The flow was established at 0.8 ml/min. Two PSS PFG Linear XL columns (Polymer Standards Service) with a guard column (PFG PSS) were applied at a temperature of 40° C. The detection was performed with a differential refractive index detector. The sample solutions were prepared with a concentration of 5 mg solids in 2 ml HFIP (+0.2M KTFA), and the samples were dissolved for a period of 24 hours. Calibration is performed with eleven polymethyl methacrylate standards (polymer standard services), ranging from 500 to 2,000,000 g/mol. The calculation was performed with Empower Pro software (Waters) with a third order calibration curve. The molar mass distribution is obtained via conventional calibration and the molar masses are polymethyl methacrylate equivalent molar masses (g/mol).

Standard Conditions

As used herein, unless the context indicates otherwise, standard conditions (e.g. for drying a film) means a relative humidity of 50%±5%, ambient temperature (which denotes herein a temperature of 23° C.±2°) and an air flow of ≥(less than or equal to) 0.1 m/s.

The following examples are provided to further illustrate the processes and compositions of the present invention. These examples are illustrative only and are not intended to limit the scope of the invention in any way. Unless otherwise specified all parts, percentages, and ratios are on a weight basis. The prefix C before an example indicates that it is comparative.

Various registered trademarks, other designations and/or abbreviations are used herein to denote some of ingredients used to prepare polymers and compositions of the invention. These are identified below by chemical name and/or tradename and optionally their manufacturer or supplier from whom they are available commercially. However where a chemical name and/or supplier of a material described herein is not given it may easily be found for example in reference literature well known to those skilled in the art: such as: 'McCutcheon's Emulsifiers and Detergents', Rock Road, Glen Rock, N.J. 07452-1700, USA, 1997 and/or Hawley's Condensed Chemical Dictionary (14th Edition) by Lewis, Richard J., Sr.; John Wiley & Sons.

In the examples the following abbreviations/monomers may be used:

BA=n-butyl acrylate (may be biorenewable)
BMA=n-butyl methacrylate (may be prepared using bio-renewable alkanols)
DBI denotes di(n-butyl) itaconate (also known as dibutyl 2-methylidenebutanedioate) (may be bio-renewable)
DDM denotes n-dodecyl mercaptane
DMI=dimethyl itaconate (may be bio-renewable)
DMW denotes dematerialized water
EDTA=ethylene diamine tetraacetic acid
HFIP denotes hexafluoro isopropanol
KTFA denotes potassium trifluoro actetate
MMA=methyl methacrylate (may be prepared using bio-renewable alkanols)
MAA=methacrylic acid (may be biorenewable)
NS denotes sodium sulfate
PAA denotes polyacrylic acid
STY denotes styrene;
D(iB)I denotes di(iso-butyl) itaconate (also known as di(tert-butyl)itaconate)
DPI denotes di(pentyl) itaconate
DHI denotes di(hexyl) itaconate
DHpI denotes di(heptyl) itaconate
DOI denotes di(n-octyl) itaconate
D(EH)I denotes di(2-ethylhexyl) itaconate
DDI denotes di(decyl) itaconate
DBzI denotes di(benzyl) itaconate
DPhI denotes di(phenyl) itaconate
BPI denotes butyl pentyl itaconate
BHI denotes butyl hexyl itaconate
HOI denotes hexyl n-octyl itaconate
IA denotes itaconic acid
MSA denotes the sulphonic acid of α-methyl styrene
DPrI denotes di(propyl) itaconate
CEA denotes beta carboxy ethyl acrylate
PA denotes propyl acrylate
OA denotes n-ocyl acrylate MBI denotes the mono acid butyl itaconate (i.e. half ester)
IAn denotes itaconic anhydride
MMaIA denotes methylene malonic acid,
MalAn denotes maleic anhydride, i
PHEMA denotes phosphated hydroxylethyl methacrylate
AMPS denotes 2-acrylamido-2-methylpropane sulfonic acid
URED denotes the monomer N-[2-(2-Oxo-1-imidazolidi-nyl)ethyl]methacrylate
MSTY denotes alpha methyl styrene

EXAMPLE 1 (VINYL BEADS)

Example 1

To a round-bottomed flask equipped with a condenser, thermometer, nitrogen inlet and mechanical stirrer are charged 950 parts of demineralised water (DMW), 1.6 parts of sodium sulphate (NS), and 7.9 parts of a 20 wt-% solution of polyacrylic acid (PAA) (weight average molecular weight ($M_w$)=100,000 g/mole). Under constant stirring and nitrogen purge a dispersed phase consisting of 253 parts of methyl methacrylate (MMA), 190 parts of dibutyl itaconate (DBI), 190 parts of styrene (STY), 9.48 parts of dilauryl peroxide (DLP), and 1.58 parts of dodecyl mercaptane (DDM) are added. The reactor contents are heated to 75° C. and allowed to polymerize for a period of 5 hours. Next, the temperature is increased to 90° C. and the reactor contents are allowed to stir for another hour. Next, the resulting polymerization mixture is cooled down to room temperature.

The polymer beads are separated from the continuous phase and washed with water and left to dry at 40° C. The polymer thus obtained has a mean particle size of 267 mm and a Tg, as determined with DSC, of 61° C.

FURTHER EXAMPLES

Examples 2 to 11

Further examples for the various embodiments can be prepared according the Common method G below and with reference to the Table below. The percentages in the tables are mostly quoted to the nearest percentage and/or to 2 significant figures and thus may not total 100% due to rounding errors.

Common Method G (for Beads)

The total weight of monomer used in Examples 2 to 11 can be the same as the total amount used to prepare Example 1 and so for convenience the amount of monomers used in these examples could also be expressed as a weight percent of the total monomers or as an absolute mass.

To the equipment described in Example 1a monomer mixture (used to prepare the polymeric beads) can be added consisting of the same ingredients described in Example 8 (or with consequent modification), other than the monomers which can be: z5% of Monomer Z4, y5% of Monomer Y5, x5% of Monomer X5 and/or w5% of Monomer W5. The rest of the process can be followed as described in Example 1 with reference to Table 1 to obtain polymeric beads analogous to those described in Example 1.

TABLE 1

Examples 2 to 11 - polymer beads (see method G)

| Ex | z3% | Z3 | y3% | Y3 | x3% | X3 | w3% | W3 |
|---|---|---|---|---|---|---|---|---|
| 2 | 40 | MMA | 30 | DBI | 20 | STY | 10 | BA |
| 3 | 10 | AA | 50 | DHI | 20 | MSTY | 10 | OA |
| 4 | 30 | EMA | 40 | DOI | 30 | OA | — | — |
| 5 | 35 | MMA | 20 | DBzI | 25 | STY | 10 | DBI |
| 6 | 10 | EA | 60 | DPhI | 30 | STY | — | — |
| 7 | 20 | MA | 30 | DBI | 30 | STY | 10 | DMI |
| 8 | 25 | MMA | 35 | DBI | 25 | STY | 5 | DEI |
| 9 | 40 | MMA | 30 | BPI | 20 | MSTY | — | — |
| 10 | 40 | EMA | 30 | BHI | 30 | MSTY | — | — |
| 11 | 35 | MMA | 25 | HOI | 30 | STY | — | — |

The invention claimed is:

1. A dispersion of polymeric beads, wherein the polymeric beads have an average diameter of between 50 μm and 1500 μm and comprise a copolymer containing styrene in an amount of less than 1.5% by weight of the copolymer, and wherein the copolymer comprises the following comonomers (a), (b), (c) and optionally (d):

(a) 24 to 70% by weight of one or more monomers represented by the Formula (1):

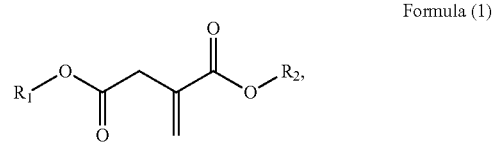

Formula (1)

where both $R_1$ and $R_2$ independently represent an optionally substituted hydrocarbo moiety having from 4 to 10 carbon atoms, (b) at least one acid functional monomer in an amount from 0.5 to 15% by weight sufficient to a achieve an acid value of the resultant copolymer of 3 to 100 mg KOH per gram of copolymer, (c) 0.01 to 10% by weight of one or more monomers represented by the Formula (2):

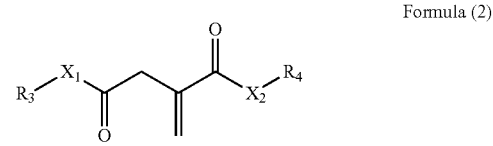

Formula (2)

in which $X_1$ and $X_2$ are both O and $R_3$ and/or $R_4$ independently represent an optionally substituted hydrocarbo moiety having from 1 to 3 carbon atoms, and (d) optionally less than 75% by weight of monomer other than comonomers (a), (b) or (c) and does not contain styrene, butyl acrylate, 2-ethyl hexyl acrylate and/or mixtures thereof; wherein the weight percentages or amounts of comonomers (a), (b), (c) and (d) are calculated as a proportion of the total amount of components (a)+(b)+(c)+(d) which totals 100%; and wherein independently at least one of the comonomers (a), (b), (c) and/or (d) and/or the copolymer obtained from comonomers (a), (b), (c) and optionally (d) are biorenewable which is defined as comprising an amount of carbon-14 sufficient to produce a decay of at least about 1.5 disintegrations per minute per gram carbon (dpm/gC);

with the provisos that:
(i) when the copolymer is prepared by an emulsion polymerisation a chaser monomer is not used;
(ii) the copolymer is not prepared in the presence of a seed polymer comprising a poly(itaconate ester); and
(iii) the copolymer is not prepared in the presence of an initiator system comprising an organoborane amine complex.

2. The dispersion of polymeric beads as claimed in claim 1, wherein component (a) comprises dibutyl itaconate.

3. The dispersion of polymeric beads as claimed in claim 1, wherein;
comonomer (a) is present in an amount of from 30 to 65% by weight and is dibutyl itaconate;
comonomer (b) is present in an amount of up to 10% by weight and comprises an acid functional ethylenically unsaturated monomer and/or anhydride thereof; and
comonomer (c) is present in an amount of from 1 to 10% by weight and is dimethyl itaconate and/or diethyl itaconate; and
optional comonomer (d), if present, is present in an amount such that comonomers (a), (b), (c) and (d) total 100% by weight.

4. A process for preparing a dispersion of polymeric beads as claimed in claim 1, the process comprising polymerising polymer precursors comprising comonomers (a), (b), (c) and optionally (d) to obtain a copolymer dispersed in a carrier.

5. The process as claimed in claim 4, wherein the process comprises conducting suspension polymerisation of olefinically unsaturated monomers in the presence of a free radical initiator.

6. A dispersion obtained by the process according to claim 4.

7. Polymeric beads obtained by isolation of the polymeric beads from the dispersion of polymeric beads as claimed in claim 1.

8. A coating composition comprising a dispersion of the polymeric beads as claimed in claim 1.

9. A substrate and/or article having coated thereon the coating composition of claim 8, wherein the coating composition is optionally cured.

10. A method of preparing a coating composition which comprises mixing the dispersion of polymeric beads of claim 1 with components of a coating formulation.

11. A method for preparing a coated substrate and/or article comprising the steps of applying the coating composition of claim 8 to the substrate and/or article and optionally curing the coating composition in situ to form a cured coating thereon.

* * * * *